(12) United States Patent
Thurnhofer et al.

(10) Patent No.: US 7,809,758 B2
(45) Date of Patent: Oct. 5, 2010

(54) DATABASE AND METHOD OF GENERATING SAME

(75) Inventors: Klaus Thurnhofer, Vienna (AT); Harald Stoiber, Vienna (AT)

(73) Assignee: Websense UK Limited, London (GB)

( * ) Notice: Subject to any disclaimer, the term of this patent is extended or adjusted under 35 U.S.C. 154(b) by 542 days.

(21) Appl. No.: 11/128,669

(22) Filed: May 13, 2005

(65) Prior Publication Data

US 2005/0267902 A1 Dec. 1, 2005

Related U.S. Application Data

(63) Continuation of application No. 10/195,847, filed on Jul. 15, 2002, now abandoned.

(30) Foreign Application Priority Data

Jul. 20, 2001 (GB) ................................. 0117721.1

(51) Int. Cl.
*G06F 17/30* (2006.01)
(52) U.S. Cl. ........................ 707/797; 707/793; 707/795; 707/796; 707/798
(58) Field of Classification Search ........................ None
See application file for complete search history.

(56) References Cited

U.S. PATENT DOCUMENTS

| | | | |
|---|---|---|---|
| 5,673,042 A * | 9/1997 | Yoshida et al. ................. | 341/51 |
| 5,712,979 A * | 1/1998 | Graber et al. ................ | 709/224 |
| 5,724,576 A * | 3/1998 | Letourneau ................. | 707/100 |
| 5,774,668 A | 6/1998 | Choquier | |
| 5,884,325 A | 3/1999 | Bauer et al. | |
| 5,896,502 A | 4/1999 | Shieh et al. | |
| 6,058,389 A | 5/2000 | Chandra et al. | |
| 6,065,059 A | 5/2000 | Shieh et al. | |
| 6,073,135 A | 6/2000 | Broder et al. ................ | 707/100 |
| 6,219,786 B1 | 4/2001 | Cunningham et al. ........ | 713/152 |

(Continued)

FOREIGN PATENT DOCUMENTS

EP 1 278 136 1/2003

OTHER PUBLICATIONS

European Search Report dated Jul. 7, 2004.

(Continued)

*Primary Examiner*—Hung Q Pham
(74) *Attorney, Agent, or Firm*—Knobbe Martens Olson & Bear LLP

(57) ABSTRACT

A database comprises a plurality of keys representing respective data items stored in the database and respective data tags associated with at least some of the data items. Data tags represent different identifiers or categories among which the associated data items are grouped. The database is arranged in the form of a tree-structured directed graph in which each of the plurality of keys is represented by a series of nodes and arcs defining a path between a root node and a terminal node, each node being linked to at least one other node by a respective arc, respective arcs for a given one of the plurality of keys representing a respective character or characters of the given key. The arcs and the nodes depending from the root node of data items which represent a sequence of characters shared by different keys are combined, and the data tags are associated with the arcs.

26 Claims, 19 Drawing Sheets

U.S. PATENT DOCUMENTS

| | | | |
|---|---|---|---|
| 6,519,571 | B1 | 2/2003 | Guheen et al. |
| 6,571,249 | B1* | 5/2003 | Garrecht et al. ............. 707/100 |
| 6,675,169 | B1 | 1/2004 | Bennett et al. ............. 707/101 |
| 6,741,997 | B1 | 5/2004 | Liu et al. |
| 6,742,003 | B2* | 5/2004 | Heckerman et al. ...... 707/104.1 |
| 7,136,867 | B1* | 11/2006 | Chatterjee et al. ........... 707/102 |
| 7,209,893 | B2 | 4/2007 | Nii |
| 2001/0032205 | A1 | 10/2001 | Kubaitis |
| 2002/0049883 | A1 | 4/2002 | Schneider et al. |
| 2002/0073068 | A1 | 6/2002 | Guha |
| 2002/0073089 | A1 | 6/2002 | Schwartz et al. |
| 2002/0087882 | A1 | 7/2002 | Schneier et al. |
| 2002/0129039 | A1 | 9/2002 | Majewski et al. |
| 2002/0133509 | A1 | 9/2002 | Johnston et al. |
| 2002/0144129 | A1 | 10/2002 | Malivanchuk et al. |
| 2002/0178374 | A1 | 11/2002 | Swimmer et al. |
| 2003/0088577 | A1 | 5/2003 | Thurnhofer et al. |
| 2003/0126136 | A1 | 7/2003 | Omoigui |
| 2003/0126139 | A1 | 7/2003 | Lee et al. |
| 2004/0015566 | A1 | 1/2004 | Anderson et al. |
| 2004/0068479 | A1 | 4/2004 | Wolfson et al. |
| 2004/0181788 | A1 | 9/2004 | Kester et al. |
| 2004/0220918 | A1 | 11/2004 | Scriffignano et al. |
| 2005/0033967 | A1 | 2/2005 | Morino et al. |
| 2005/0210035 | A1 | 9/2005 | Kester et al. |
| 2005/0223001 | A1 | 10/2005 | Kester et al. |
| 2006/0004636 | A1 | 1/2006 | Kester et al. |
| 2006/0031504 | A1 | 2/2006 | Hegli et al. |

OTHER PUBLICATIONS

Abiteboul et al. "The Lorel query language for semistructured data". Int'l Journal on Digital Libraries. vol. 1 No. 1 Apr. 1, 1997. pp. 68-88.

Goldman et al. "DataGuides: Enabling Query Formulation and Optimization in the Semistructured Databases". Proceedings of the International Conference on Very Large Data Bases. Aug. 26, 1997. pp. 436-445.

Nestorov et al. "Representative objects: concise representations of semistructured, hierarchical Data". Proceedings, 13$^{th}$ Int'l Conference on Birmingham, UK. Apr. 7-11, 1997. pp. 79-90.

Dell Zhang et al. "A data model and algebra for the Web." Proceedings 10$^{th}$ Int'l Workshop on Florence. Italy. Sep. 1-3, 1999. pp. 711-714.

Chawathe et al. "Representing and querying changes in a semistructured data" Proceedings from 14$^{th}$ Int'l Coneference. Feb. 23-27, 1998. pp. 4-13.

Abiteboul, et al., The Lorel query language for semistructured data, Int'l Journal on Digital Libraries, Apr. 1, 1997, vol. 1, Issue 1, pp. 68-88.

Chawathe, et al., Representing and querying changes in a semistructured data, Proceedings from 14th Int'l Conference, Feb. 23-27, 1998, pp. 4-13.

Dell Zhang, et al., A data model and algebra for the web, Proceedings 10th Int'l Workshop on Florence, Italy, Sep. 1-3, 1999, pp. 711-714.

European Search Report for Application No. 02255055.2, EPO, Jul. 7, 2004.

Garcia-Molina et al., Database System Implementation, Department of Computer Science, Stanford University, Prentice Hall, 2000.

Goldman, R., et al., DataGuides: Enabling Query Formulation and Optimization in Semistructured Databases, Proceedings of the International Conference on Very Large Data Bases, Aug. 26, 1997, pp. 436-445.

Nestorov, et al., Representative objects: concise representations of semistructured, hierarchical Data, Proceedings, 13th Int'l Conference in Birmingham, UK, Apr. 7-11, 1997, pp. 79-90.

Symantec Corporation, E-security begins with sound security policies, Announcement Symantec, XP002265695, Jun. 14, 2001, pp. 1,9.

* cited by examiner

| Category | Code |
| --- | --- |
| Music | 0 |
| Property | 1 |
| City | 2 |
| Material entity | 3 |

| Key | Code |
| --- | --- |
| BABYLON | 2 |
| BARITONE | 0 |
| NYLON | 3 |
| XYLOPHON | 0 |
| POLYPHON | 0 |
| POLY | 1 |
| STEROTYPE | 1 |
| MONOPHON | 0 |
| METALLOPHON | 0 |
| STEREOPHON | 0 |
| THRONE | 3 |
| NINTH | 0 |
| POLYMORPH | 1 |

*Fig. 3*

Discard superfluous data tag

Calculate checksum

Optimised tree

DATABASE AND METHOD OF GENERATING SAME

RELATED APPLICATION

This application is a continuation of U.S. patent application Ser. No. 10/195,847, filed on Jul. 15, 2002 now abandoned.

BACKGROUND OF THE INVENTION

The present invention relates to a database and a method of generating a database. In particular the invention relates to a database which facilitates efficient storage of data, rapid search and retrieval of data.

DESCRIPTION OF THE PRIOR ART

Databases are used in computer-based information and processing systems for the storage of large quantities of information or data items for subsequent retrieval and processing. Such databases often require updating from time to time for redistribution to users who may be situated remotely from the producer of the database. Logistical difficulties can arise when databases become large. For example, users of the database might not have the same storage capacity enjoyed by the database creator and in cases where users download updated databases via a computer network such as the Internet, download times can become burdensome and functionality may be compromised.

Preferred methods of data storage vary depending on the type of data to be stored. Opportunities for compression of data exist particularly when data to be stored contains repetitive elements. Various schemes exist in the art for increasing the efficiency of data management. For example, relational databases are adopted in situations where it is desirable to avoid repetition of data entry. A relational database might be adopted for customer contact information having different categories. Such a database might employ a plurality of separate database tables, one for each category of information such as: one for customer name and address, a second for accounting records and a third for product information. These tables are linked, or related, by a customer ID so that accounting and/or product information can be retrieved without the need to store customer name and address data in the table of each category.

A difficulty arises when it is desired to store a large number of data items which are to be classified into a relatively small number of different categories. In such a case, the database is likely to be structured as a single table listing the data items. The category of each data item is then stored against each data item in the table. The difficulty is that the resulting table becomes extravagant on storage space because the same category identification is stored many times within the same table. As the database becomes larger, the more difficult it is to transfer between users and the longer it takes to retrieve information from it.

This problem of 'wasted space' is exacerbated in cases where the data items contain repetitive elements or components. For example, in a database for relating Internet web pages identified by Uniform Resource Locators (URL's) to subject category, it is expected that there will be millions of URL's and subject categories numbered in the order of a few tens to hundreds, possibly a few thousand. URL's are keys containing strings of alphanumeric and other characters. Not only is there 'wasted space' in the storage of identical subject categories against multiple data items, but there is 'wasted space' in storing elements (i.e. strings of characters) which repeat themselves among the URL's.

Although numerous methods of data compression are known in the art, these techniques are generally applicable to the passive storage and transport of data. In other words, the database is not designed to facilitate search and retrieval of data while in a compressed state. It is an aim of the invention to devise a database structure which provides for greater storage capacity and searching speed in a decompressed state.

U.S. Pat. No. 6,219,786 relates to a method and system for monitoring and controlling computer users' access to network resources from both inside and outside the network. The system monitors network traffic and applies access rules to the traffic to permit or deny access to predetermined network resources. In one application of this system, a networked computer may be monitored so that access to predetermined Internet web-sites can be permitted while others denied. Such a system may include a database of URL's which are categorised by subject. Given the existence of many tens or even hundreds of millions of URL's which may be accessed via the World Wide Web (www), a database of these containing a category data tag for each can be expected to require a great deal of storage capacity and be slow to search.

OBJECTIVES AND SUMMARY OF THE INVENTION

It is therefore an aim of the invention to devise a database structure and method of generating same which alleviates these problems. In particular, it is an aim of the invention to devise a database structure which can contain more data items than in prior art database structures having the same storage capacity. It is another aim to provide for faster retrieval of data. It is a further aim of the invention to devise a database structure which provides for faster confirmation of the absence of a data item.

It is an aim of the invention to devise a database which can store many millions of URL's and their respective category data tags (numbering tens to hundreds) with a reduced storage requirement. It is a further aim to provide for faster retrieval and searching of such a database.

According to a first aspect of the present invention there is provided a database comprising a plurality of keys representing respective data items stored in the database and respective data tags associated with at least some of the data items, respective data tags representing different identifiers or categories among which the associated data items are grouped, wherein the database is arranged in the form of a tree data structure in which each of said plurality of keys is represented by a series of nodes and arcs defining a path between a root node and a terminal node, each node being linked to at least one other node by a respective arc, respective arcs for a given one of said plurality of keys representing a respective character or characters of said given key, and wherein the arcs and the nodes depending from said root node of data items which represent a sequence of characters shared by different keys are combined, and the data tags are associated with the arcs.

In a preferred embodiment of the invention, a data tag is associated with each one of the arcs so that a data tag is read from the database as said respective character(s) of the key are read from the database. The last data tag which is read before reaching a terminal node defines the category or identifier of the key. In cases where successive arcs within a path have the same data tags associated with them, only one, for example the first occurrence of the data tag when reading from the root node, is stored in the database to reduce or eliminate redundancy of data therein.

According to a second aspect of the present invention there is provided a database comprising a plurality of keys representing respective data items stored in the database, wherein the database is arranged in the form of a tree data structure in which each of said plurality of keys is represented by a series of nodes and arcs defining a path between a root node and a terminal node, each node being linked to at least one other node by a respective arc, respective arcs for a given one of said plurality of keys representing a respective character or characters of said given key, and wherein the arcs and the nodes depending from said root node of data items representing a sequence of characters shared by different keys are combined, and the arcs and the nodes extending from a given terminal node of data items representing a sequence of characters shared by different keys are also combined, said given terminal node being a sink.

A database may incorporate the first and the second aspects of the invention. In such a database, the data tags are rationalised to minimise the amount of storage space taken up by category or identifier information for the keys and further storage saving measures are achieved by the combining of arcs and nodes between characters or character sequences shared by different keys when reading from the root node to the terminal nodes and when reading from the terminal nodes to the root node, wherein said terminal nodes are sinks.

According to a further aspect of the present invention there is provided a method of generating a database having a plurality of keys representing respective data items stored in the database and respective data tags associated with at least some of the data items, respective data tags representing different identifiers or categories among which the data items are grouped, wherein the method comprises:

generating a data set represented by tree data structure in which each of said plurality of keys is represented by a series of nodes and arcs defining a path between a root node and a terminal node, each node being linked to at least one other node by a respective arc, and respective arcs for a given one of said plurality of keys representing a respective character or characters of said given key wherein arcs and nodes depending from said root node of data items which represent a sequence of characters shared by different keys and category or identifier are combined; and associating at least some of the arcs with data tags which correspond to the category or identifier of the key represented by the character or characters of the arc.

In a preferred embodiment, the method further includes compacting the data set by removing from a sequence of repeating identical data tags all but one of said identical data tags. Preferably, successive data tags identical to the first occurrence thereof in the sequence are removed. This allows redundant data tags to be removed from the database thereby making space available for more data items.

According to a yet further aspect of the present invention, there is provided a method of generating a database having a plurality of keys representing respective data items stored in the database, wherein the method comprises:

generating a data set represented by tree data structure in which each of said plurality of keys is represented by a series of nodes and arcs defining a path between a root node and a terminal node, each node being linked to at least one other node by a respective arc, and respective arcs for a given one of said plurality of keys representing a respective character or characters of said given key, wherein arcs and nodes depending from said root node of data items which represent a sequence of characters shared by different keys are combined; and compacting the data set so that arcs and nodes extending from a given terminal node towards said root node of data items which represent a sequence of characters shared by different keys are also combined, said given terminal node being a sink.

In a yet further aspect of the present invention, there is provided a method of generating a database having a plurality of keys representing respective data items stored in the database and respective data tags associated with at least some of the data items, respective data tags representing different categories or identifiers among which the data items are grouped, wherein the method comprises:

generating a data set represented by a tree data structure in which each of said plurality of keys is represented by a series of nodes and arcs defining a path between a root node and a terminal node, each node being linked to at least one other node by a respective arc, and respective arcs for a given one of said plurality of keys representing a respective character or characters of said given key wherein arcs and nodes depending from said root node of data items which represent a sequence of characters shared by different keys and category or identifier are combined;

associating at least some of the arcs with data tags which correspond to the category or identifier of the key represented by the character or characters of the arc;

compacting the data set by removing from a sequence of repeating identical data tags all but one of said identical data tags; and further compacting the data set so that arcs and nodes extending from a given terminal node towards said root node of data items which represent a sequence of characters and category or identifier shared by different keys are also combined, wherein said given terminal node is a sink node.

The steps of compacting the data set may each include a recursive routine. Successive data tags identical to first occurrence thereof in the sequence may be the ones removed.

In a preferred embodiment, said compacting step may include assigning a weight value to nodes of the data set, the weight value of a given node being dependent on the characters between said given node and an associated sink(s), said given node and associated sink(s) defining a sub-tree of said data set, and identifying two or more nodes having identical weight values as potentially having identical sub-trees. The weight value may be based on a checksum value incorporating the category or identifier of an arc extending from the node to which the weight value is being applied, in addition to the characters in the sub-tree. The checksum value may further incorporate an indication of the size of the associated sub-tree of the given node.

The step of compacting to reduce identical sub-trees includes comparing with one another the nodes and sub-trees depending from, and including, nodes having identical weight values. Nodes having weight values representative of longer sub-trees are preferably compared and compacted prior to those representative of shorter ones. This provides for a faster compaction operation. Nodes and their respective sub-trees identified as identical are rationalised by directing the arc(s) leading to one of the nodes to the other node and removing said one node and its associated sub-tree from the database. This may be done using a recursive routine.

Any node except the root node may be a terminal node, provided it represents the end of a path defining a key. All nodes that have no further arcs leading to further nodes are terminal nodes, sometimes referred to as 'sinks'. A node may be a terminal node because it defines the end of a key, but may also have further arcs leading to other nodes, the further arcs representing characters of other keys. The tree data structure may be in the form of a tree-structured directed graph.

In an embodiment of the present invention, the data items may represent Universal Resource Locators (URL'S) for identifying Internet web pages, the categories corresponding to subject matter types, respective data tags representing different subject matter types.

According to the present invention, there is yet further provided a data carrier having stored thereon a database as defined according to any aspect of the invention hereinabove. The data items of the database may be URL's and the data tags may be subject matter types for them. The data carrier may be in the form of any computer readable medium, such as: CD-ROM; a hard disk of a personal computer or network server; magnetic tape; or data stream.

According to the present invention, there is yet further provided a computer program containing code, which when run on a computer can configure the computer to generate a database according to any of aspect of the invention defined hereinabove. The computer program may contain code for configuring a computer to perform any of the methods of generating a database as defined hereinabove.

The terms used herein are defined in a dictionary published by the National Institute of Standards and Technology (NIST), see in particular their Dictionary of Algorithms, Data Structures and Problems. This may be accessed via the Internet (see URL: http://www.nist.gov/dads/terms.html).

It should be noted that variations may be made to embodiments of the present invention without departing from the scope thereof. For example, there may be instances within a tree-structured directed graph in which pairs of nodes are linked by more than one arc.

Embodiments of the invention have the advantage that information in the form of sequences of characters that recur in many different keys (for example, the sequences "www.", and ".com" occur in a great many URLs) need only be stored a minimum number of times in the database. This results in a substantial reduction in the bit size of the database and the amount of memory required. A further advantage is searching is very fast because once a sequence of characters occurring in the key being sought has been found, there is no need to search anywhere else in the database for those characters. This arises from the tree-structured directed graph in which there is only one valid next move as a data item to be searched is looked up in the tree-structure. Also, once it is determined that the next character in a sequence is not present in the database, the search can be terminated because the key will not be present elsewhere.

Further advantages arise from the optimisation and storage of the data tag information. By storing the data tags with the characters of the keys, as a key is read the data tag is also read, removing the need to retrieve the data tag from an associated data location. Removal of redundant data tags results in a substantial reduction in the amount of data that has to be stored. In the case where the database stores URL's, a tenfold reduction in the size of the database is contemplated relative to prior art database structures which may be employed.

BRIEF DESCRIPTION OF THE DRAWINGS

The invention will now be further described by way of example, with reference to the following drawings, in which:

FIG. 3 is an example of data items for use in an illustration of a database embodying the first and/or second aspects of the present invention;

DETAILED DESCRIPTION OF THE INVENTION

Figure 1:
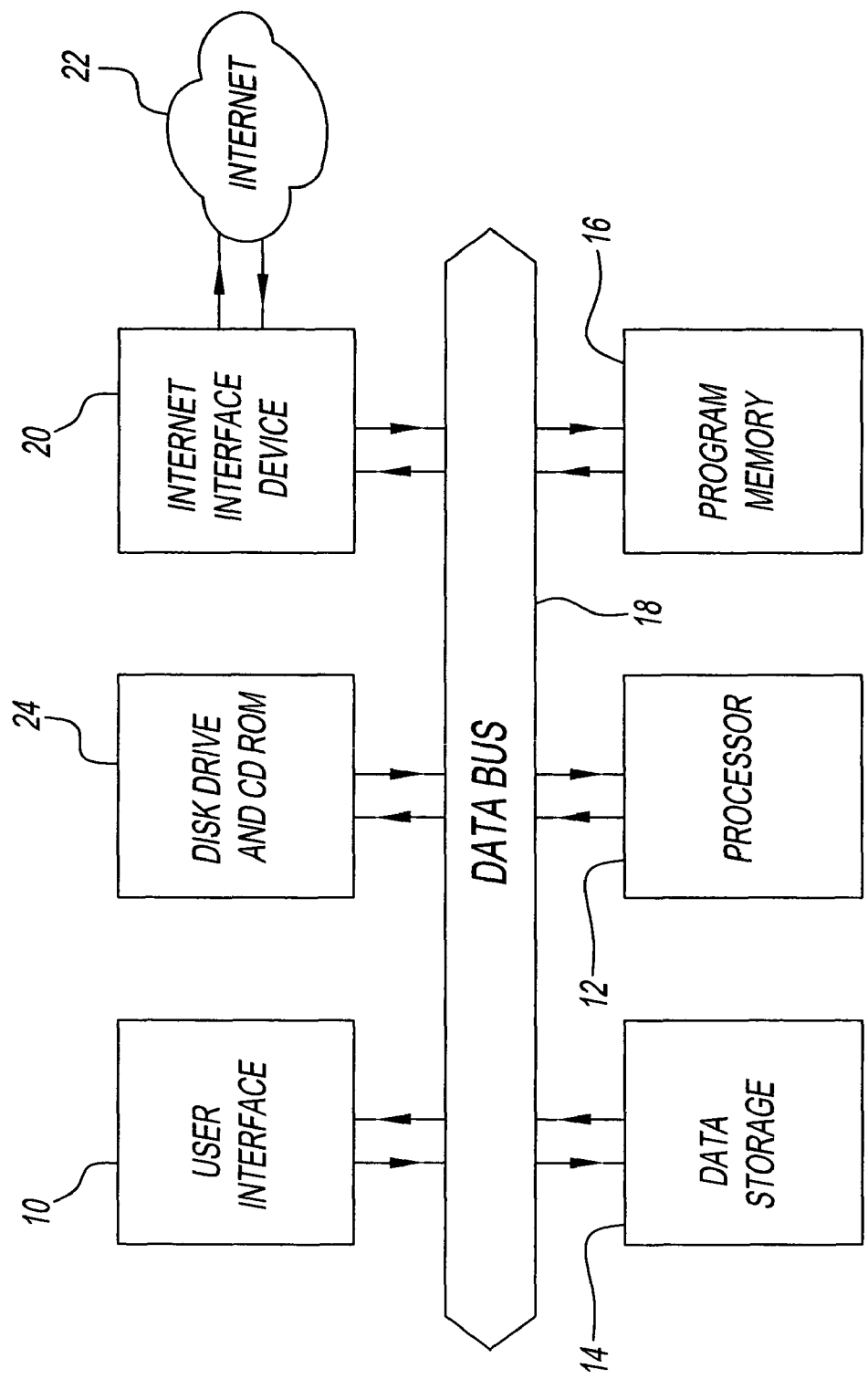
FIG. 1 is a schematic diagram of a known computer system on which a database embodying aspects of the present invention may be implemented.

Referring to FIG. 1, a computer system comprises a user interface 10, a processor 12, a data storage means 14, and program memory 16, all of which communicate with each other via a data bus 18. The computer system further comprises an internet interface device 20 for facilitating communication with the internet 22. A disk drive and/or CD ROM drive 24 facilitate reading and/or writing of data to and from portable media such as floppy disks or CDs. User interface 10 comprises an information display, for example a monitor, and a user input means such as a keyboard and/or a mouse. Instructions contained in the program memory 16 control the processor 12 to process data stored in the data storage means 14 or read from portable media via the drive 24 or downloaded from the internet 22. The system shown in FIG. 2 describes a single user system, however it will be appreciated that the system is extendable to link two or more users communicating via the data bus 18 or internet/intranet/extranet links thereto.

Computer systems such as the one described in FIG. 1 utilise databases comprising lists of information items and associated categories. The information items are in the form of keys, each key comprising a unique character string, for example names of people/companies/places/products etc. The categories are represented in the database by a category code, for example a number and take the form of a data tag associated with each key. When information about the category of an item is required, for example at the request of a user, or in response to a coded instruction as part of a software routine or control procedure, the computer performs a search of the database to locate the key and retrieve the data tag.

Databases can be very large, some holding many millions of keys and their associated data tags. Prior art database structures tend to be such that the computer has to search sequentially through the entire list of keys stored in the database to find one that matches the required key. It then retrieves the data tag to identify the category. Two problems limit the efficacy of such systems: firstly, the amount of data stored can be prohibitively large, using up an excessive amount of data storage capacity; secondly, the processing time for completing the search can be very long and use up a large amount of computer memory.

Figure 2:
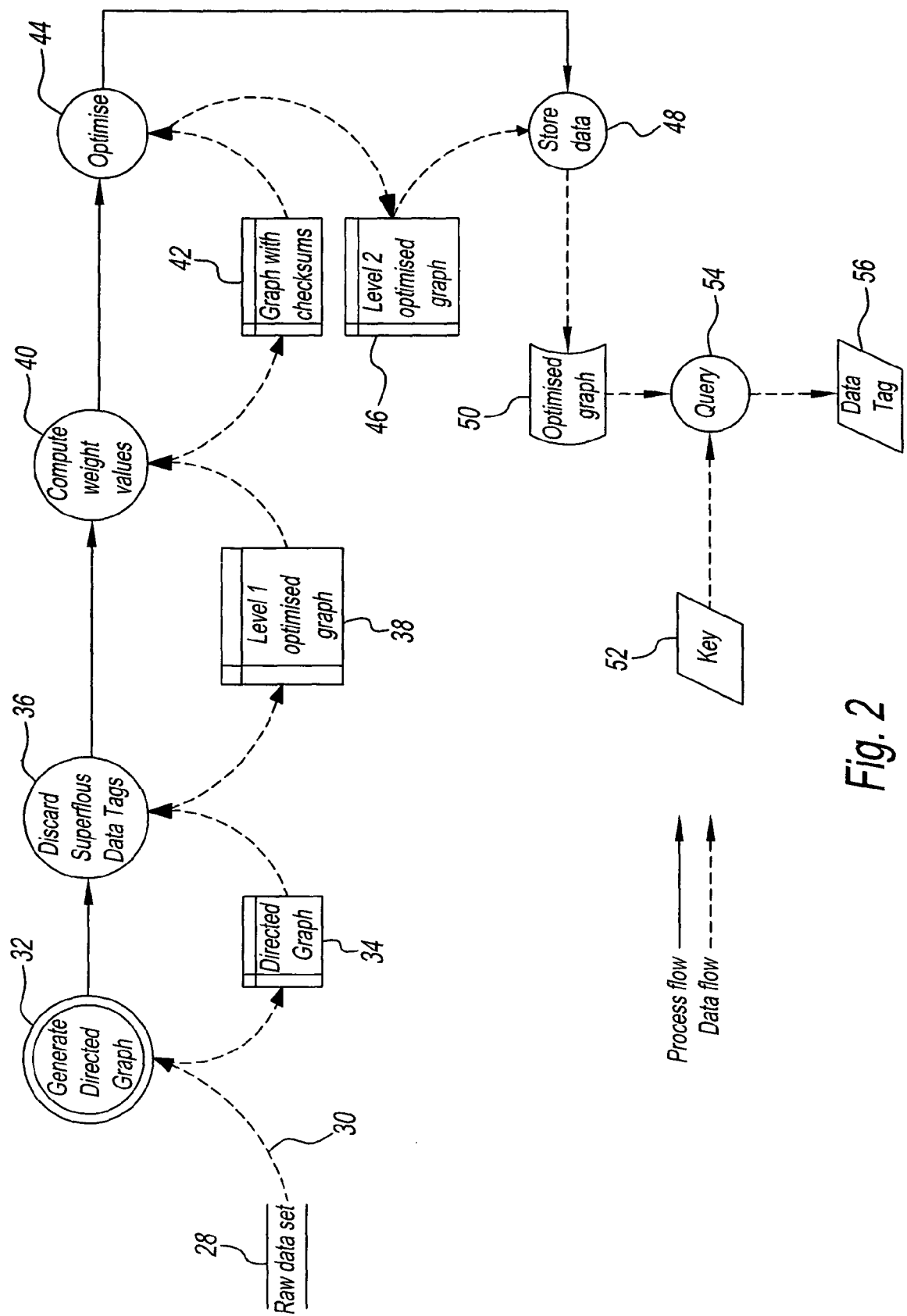
FIG. 2 is a flow diagram outlining a method for generating a database in accordance with the first and second aspects of the present invention.

FIG. 2 shows a process for creating a compact and rapidly searchable database in accordance with the various aspects of the present invention. The processes that make up the steps of FIG. 2 will be described for a specific example, using the data items shown in FIG. 3, with reference to FIGS. 4 to 17. Referring to FIG. 2, the raw data 28 (keys and associated data tags) are read in at step 30. At step 32 the raw data is processed to produce a data structure representative of a tree data structure or tree-structured directed graph 34, as will be described in more detail below with reference to FIGS. 4 to 6. At step 36 an algorithm is used to identify and discard superfluous data tags and produce a data structure representative of an optimised directed graph 38, as will be described below with reference to FIGS. 7 and 8.

The optimised directed graph 38 is compacted by the processes of steps 40 and 44. At step 40 weight values are assigned as will be described with reference to FIG. 9. At step 44 the weight values are used to identify and reduce redundant key data to produce a data structure representative of a compacted directed graph 46, as will be described with reference to FIGS. 10 to 16.

At step 48 the optimised and compacted directed graph 46 is stored as a final database 50 in a data storage format that will be described with reference to FIG. 17. When the system requires to know the category (data tag) associated with a key, the key data is read by the system and the database 50 is searched at step 54 to rapidly retrieve the required data tag 56.

FIG. 3 illustrates a data set to be used as an example for describing the processes that make up an embodiment of the invention. The data set of FIG. 3 comprises a set of keys "BABYLON", "BARITONE" etc., to each of which is assigned a data tag 0, 1, 2, or 3 according to which of the four categories: music, property, city or material entity, the key has been assigned. It will be appreciated that the data set of FIG. 3 is shown here only for the purpose of describing the embodiment of the invention, and is very small compared with most databases in use on computer systems.

Figure 4:
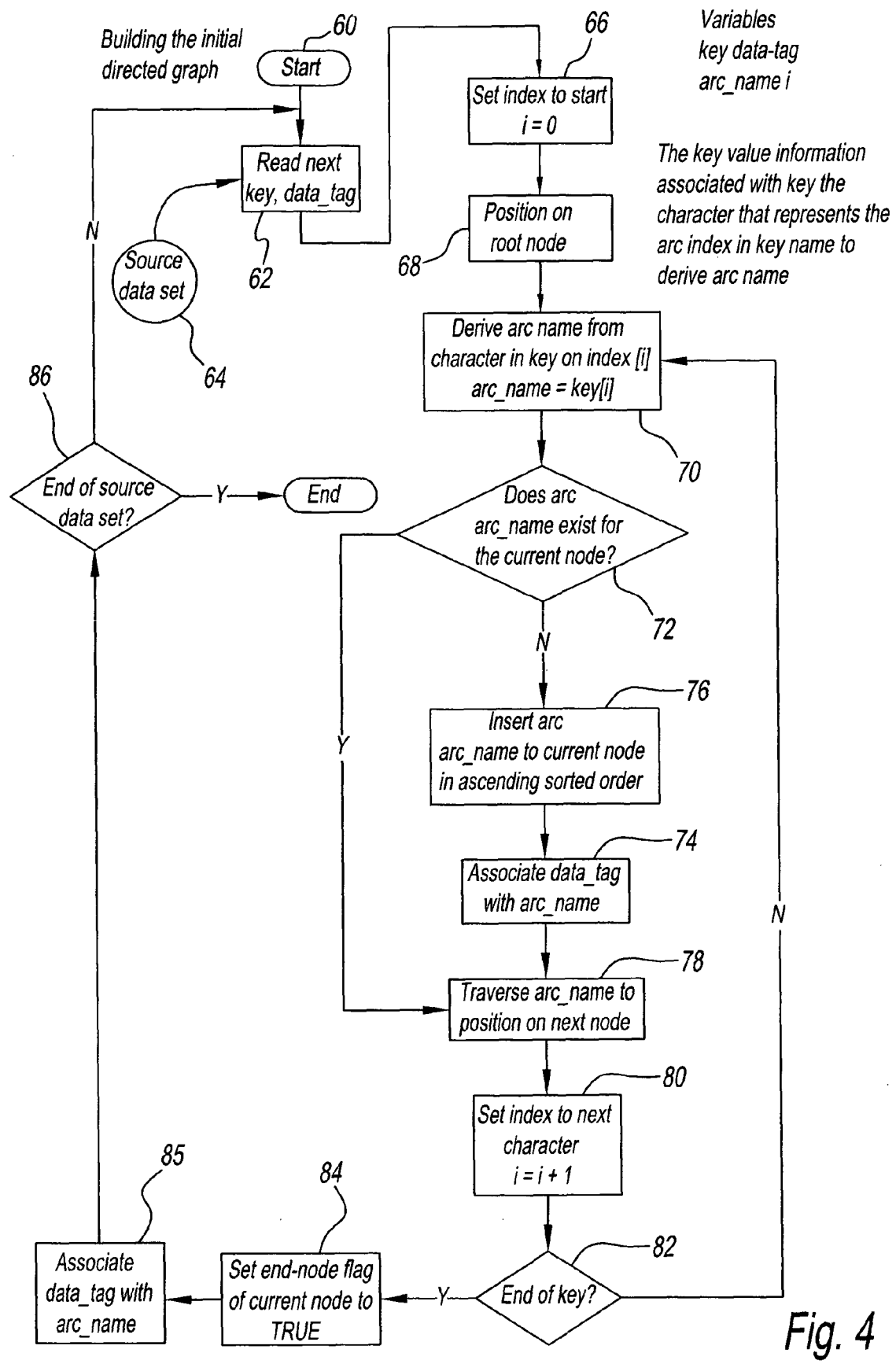
FIG. 4 is a flow diagram with reference to which generation of a database embodying the first aspect of the present invention is explained.
Figures 5A, 5B, 5C, 5D, 5E:
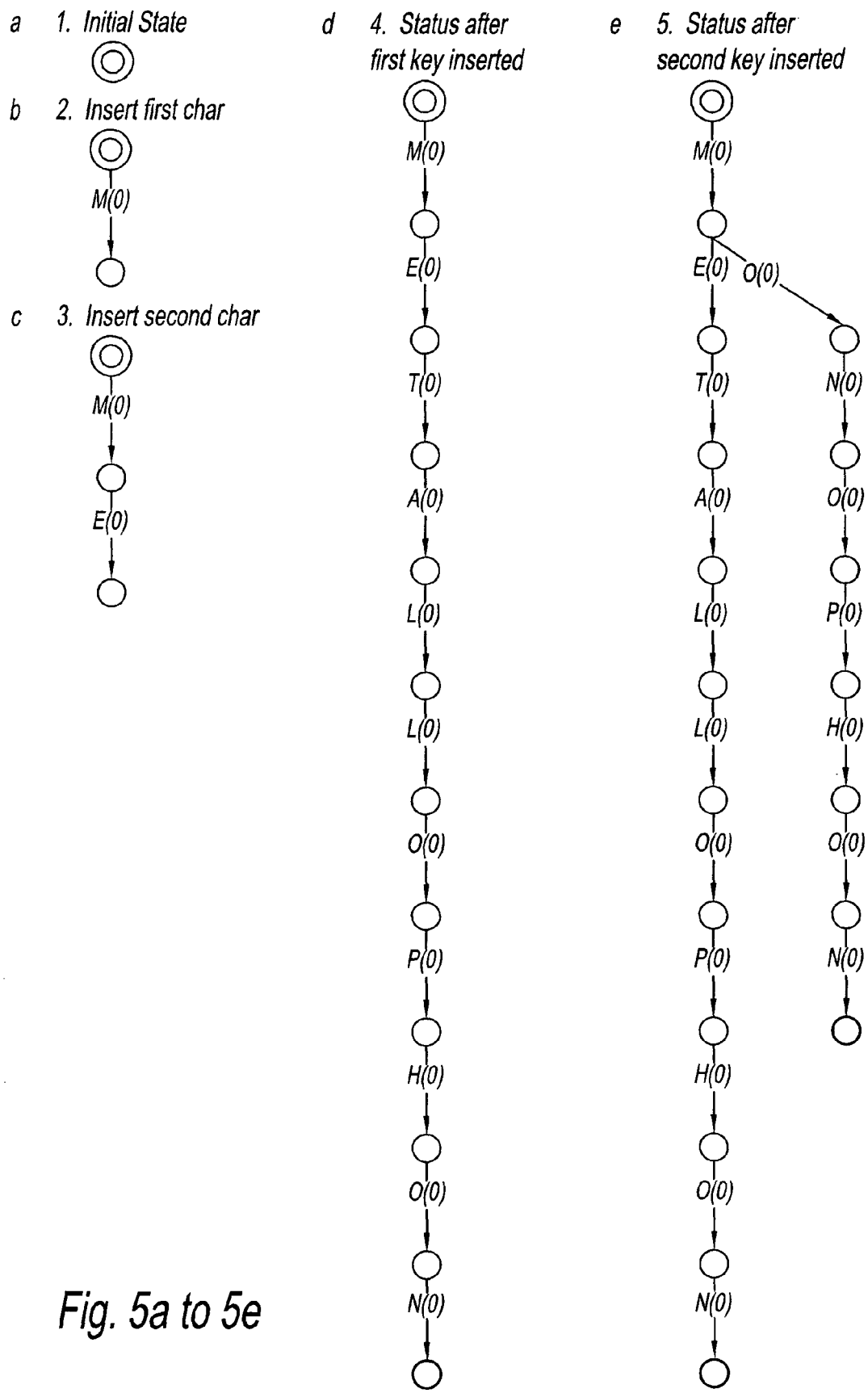
FIGS. 5a to 5e are conceptual representations for explaining the building up of a tree data structure for the data items of FIG. 3.
Figure 6:
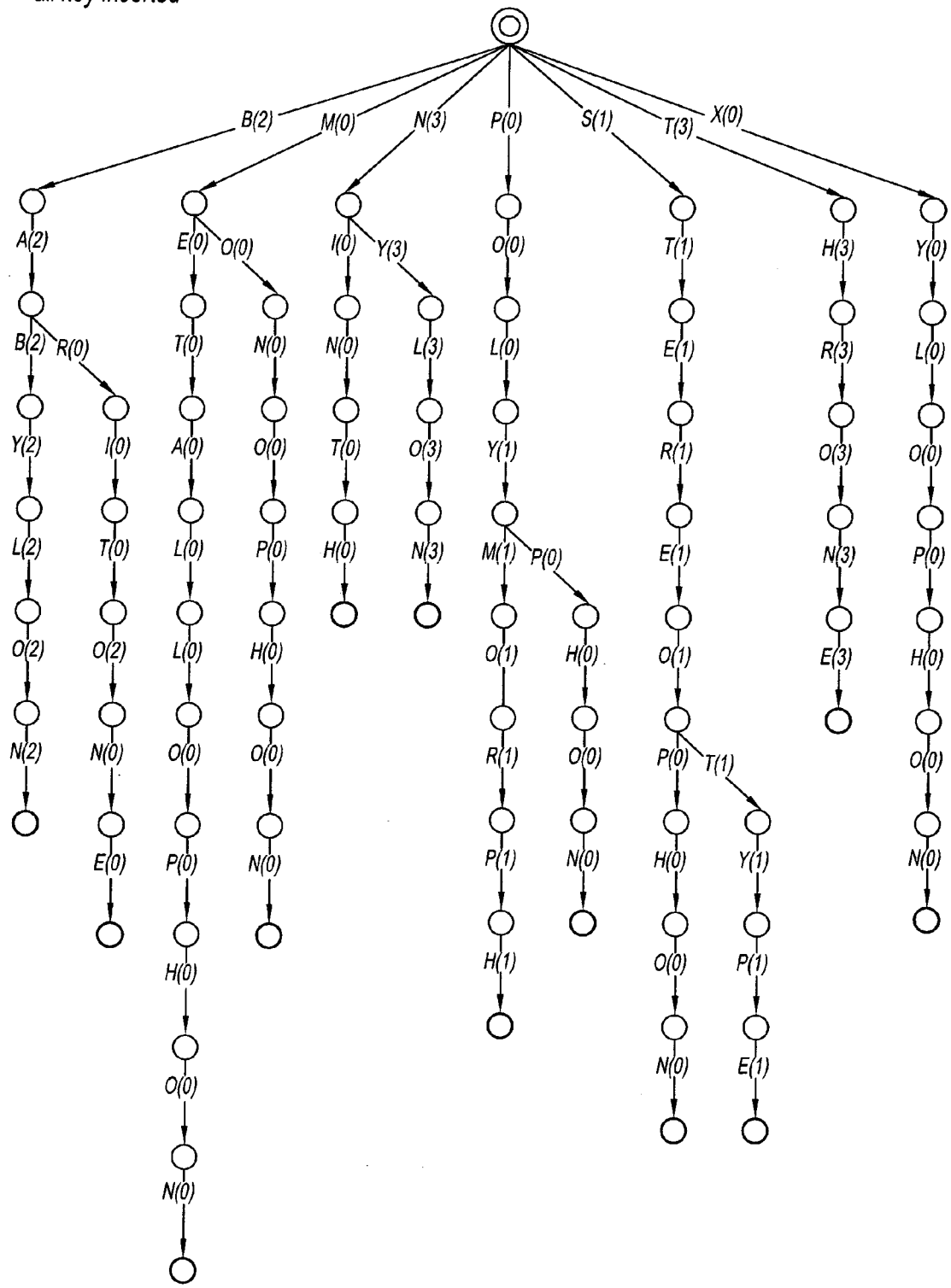
FIG. 6 is a conceptual representation of a tree data structure in accordance with the first aspect of the present invention.

FIG. 4 shows the process for generating a tree-structured directed graph, and will be described with reference to FIGS. 5 and 6 to describe generation of a tree-structured directed graph for the data set of FIG. 3. A directed graph is a way of visualising, in two dimensions, an arrangement of data. Trees in the context of data structures, graphs and directed graphs are all known terms in the art (see for example, the NIST dictionary referred to above). The data itself remains as a binary encoded bit stream stored electronically by the computer system. The data in a directed graph structure is represented by arcs, each arc representing a character (e.g. a letter or numeral). It is contemplated that a given character could represent more than one alpha-numeric character of the data item. The arcs interconnect nodes. A node does not represent any of the source data, but represents a point or junction between one character and one or more further characters. In FIGS. 5 and 6 nodes are represented as circles and arcs are represented as lines having arrowheads pointing towards the node to which the arc leads. The root node is represented by a larger circle having a smaller circle inside it, and terminal nodes are represented by bold circles. The structure of the directed graph will become more apparent as the process of generation is described.

In the beginning the graph is blank and has only a root node with no arcs assigned. All the keys are now incorporated individually into the graph character by character, whereby their characters are stored along the arcs, and all arcs of a node are sorted in ascending order according to their key-character information. Sorting the arcs lends itself to fast search operations within a node. If a new arc is created, and not merely traversed, the data tag (or a reference to it) for the current key must also be filed along this arc so embodying the first aspect of the present invention. Each node to which the last arc of a key opens has to be marked as a terminal node and must be equipped with the current key's data tag. Consequently, following completion of the process there is a deterministic finite state machine available, which is the basis of the further steps.

The process of building a graph from a set of data items is started at step 60. At step 62 a key and associated data tag are read from the source data set 64. At step 66 an indexing counter is set to 0. Thus far no data has been processed and the directed graph consists only of a single root node and no arcs, as shown by the "initial state" of FIG. 5a. At step 68 the directed graph generator is positioned on the root node. At step 70 the process reads the next character of the key, key[i]. The first time through the process this is the first character of the key, key[0], as defined by the indexing counter. FIGS. 5b to 5e show the example where the first key read is METALLOPHON. Thus the first character is the letter "M", and this is called the arc name of the next (first) arc. At step 72 the process interrogates the data structure as to whether the character "M" already exists as an arc. As no arcs have yet been generated, the answer must clearly be No, and the process proceeds to step 74, where the arc is generated. At step 76 the associated data tag is also added to the arc. In the example, "metallophon" has been assigned the category 0, "music". At step 78 the arc is traversed to position the generator on the next node, i.e. the node at the end of the arc. The directed graph is now at state 2 as shown in FIG. 5b.

At step 80, the indexing counter is increment by 1. At step 82 the process interrogates the data to ask if the end of the key has been reached. The answer in the example case is No, and the process returns to step 70 to commence generation of the next arc, which this time is given the arc name key[1], the letter "E". Again at step 76, the data tag is added to the arc, and the directed graph is then at state 3 as shown in FIG. 5c. The process repeats for each letter of the key until eventually all the letters of "METALLOPHON" have been assigned to arcs.

This time, at step 82 the answer is Yes and the process proceeds to step 84 where a flag data bit is added to the data to indicate that the node at the end of the last arc "N" is a terminal node. The directed graph is then at state 4, as shown in FIG. 5*d*.

At step 85 the process ensures that the data tag associated with the last arc of the key is that associated with the key. In most cases the data tag will have been associated with the arc name at step 76, however it is possible that the key may be made up entirely of characters already contained in the database and that step 76 will have been by-passed for every character of the key. In such circumstances it is necessary to associate the correct data tag with the last arc in the key. An example of this can be seen in FIG. 6, which shows the directed graph for the data set of FIG. 3. The key POLY has all its characters the same as the first four characters of the key POLYMORPH, but has a data tag of 1 whereas POLYMORPH has a data tag of 0. Therefore if POLY is entered into the database after POLYMORPH, all the arcs will already exist and have associated data tags of 0. Therefore the arc representing the last character "Y" of POLY must have the correct data tag 1 associated with it by overwriting the previous data tag. Note that the arc "Y" leads to a terminal node, but the terminal node is not a sink.

At step 86 the process interrogates the data to see if the end of the data set has been reached. If the answer is Yes, the process is ended. However, in the illustrative example the answer is No, so the process returns to step 62 to read the next key and associated data tag. The next key is "MONOPHON". Here, when the process reaches step 72 for the first time and asks whether the arc name "M" exists for the current node (in this case the root node), the answer is Yes because the arc with arc name "M" was generated for the key "METALLOPHON". The process therefore steps ahead to step 78, without generating an arc. The next time around, at step 72, the process asks the same question of the arc name "O", but here the answer is No, and so a new arc must be generated. Thereafter, for MONOPHON all arcs will be new arcs because there will be no existing arcs connected to the nodes. State 5, as shown in FIG. 5*e* has then been reached.

Once the process has been undertaken for all of the keys of the data set, the data will represent the directed graph of FIG. 6. Note that the directed graph is termed "tree-structured", because each key is represented by a pathway of arcs commencing at the root node and terminating at a terminal node. Each arc may only be traversed once and (at this stage) each node is only arrived at via one arc, but may have more than one arc departing from it.

The data structure represented by FIG. 6 is well suited for searching. Starting at the root node a searching algorithm only needs to look for an arc with an arc name the same as the first character of the key being searched, and then to follow the path of arcs with arc names equivalent to the characters of the key, to identify the existence of the key in the database when the terminal node is reached. On reaching any node without an arc having an equivalent arc name to the next character of the key identifies the absence of the key from the data base. Furthermore, if the algorithm reads the data tags of the arcs as it traverses the pathway, disregarding the previously read data tag each time it reads a new data tag, then when it reaches a terminal node, the last data tag to be read will be the one associated with the key and will correctly identify the category of the key.

Nevertheless, the data structure of FIG. 6 is far from optimised. Data tags are stored with every arc, but this entails storing a great many more data tags than necessary to identify the tag associated with a key. The process shown in FIG. 7 removes superfluous data tags. The process is recursive, which is to say that it involves passing through the steps of a procedure that includes all the steps of the procedure itself as one of the steps. In other words it involves calling a subroutine, which calls itself.

Figure 7:
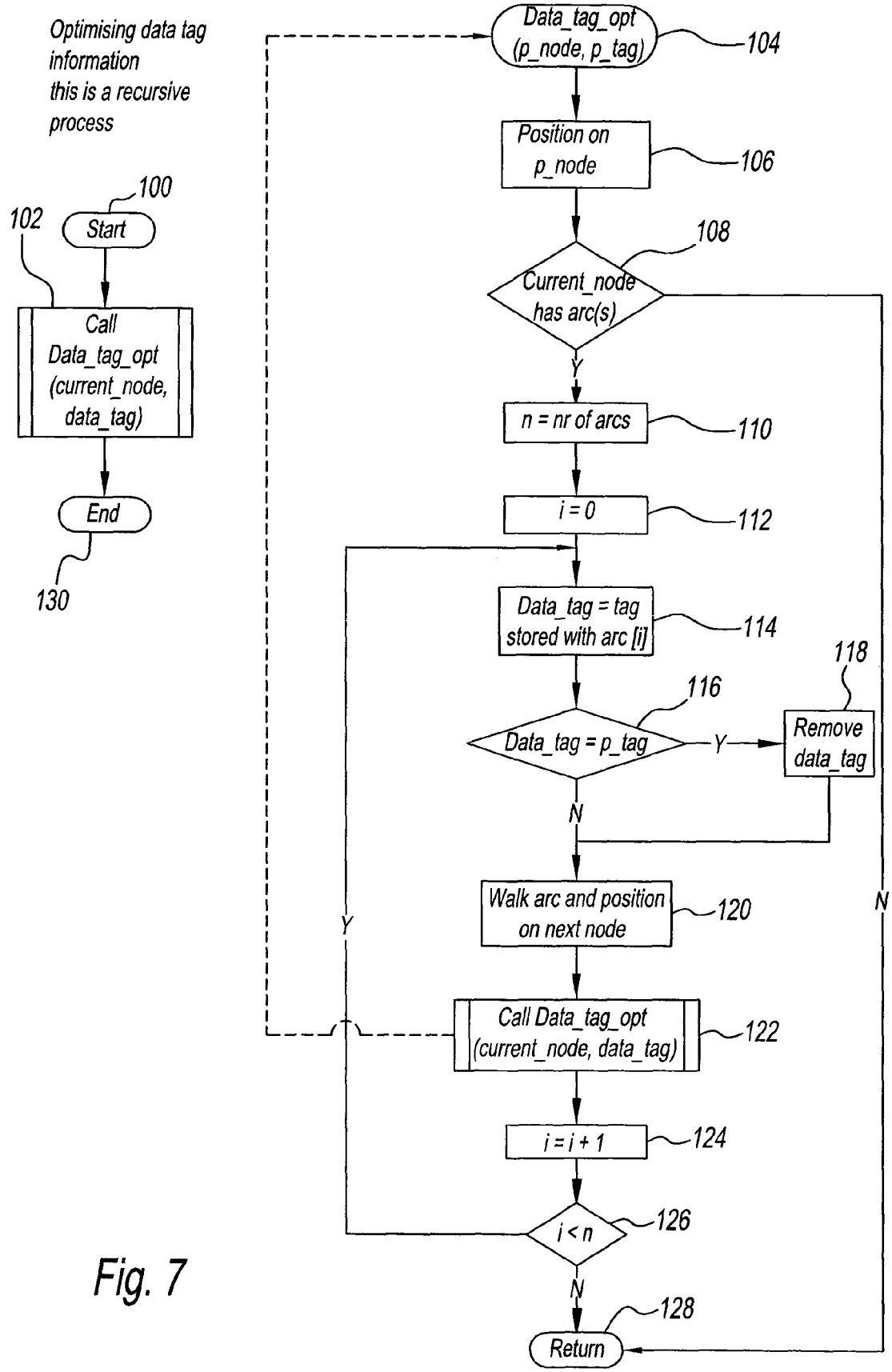
FIG. 7 is a flow diagram with reference to which a process of data tag optimisation is described.
Figure 8:
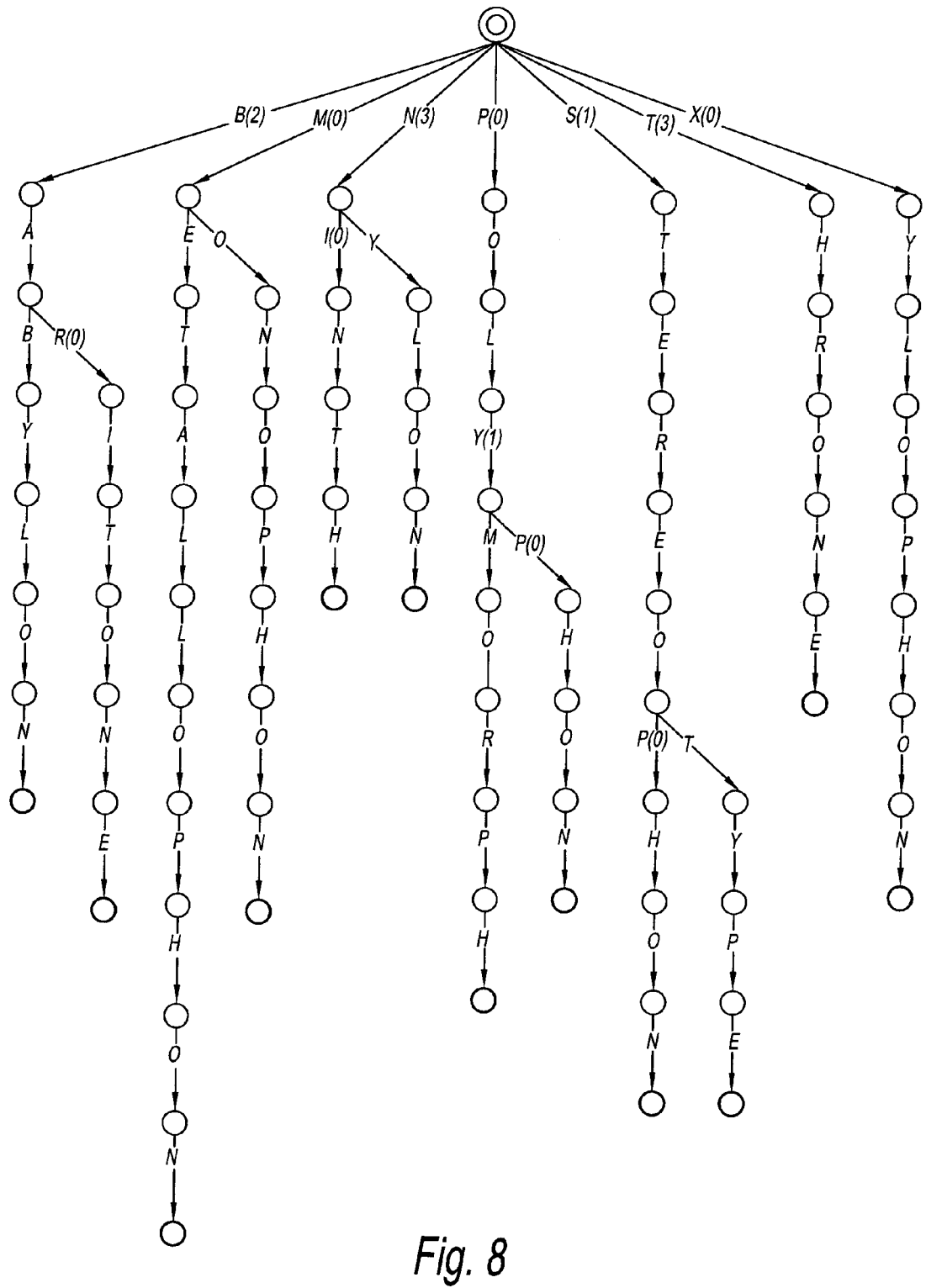
FIG. 8 shows the directed graph representation of FIG. 6, in which redundancy of the data tags in accordance with the process of FIG. 7 has been reduced.

The process illustrated by the flow chart of FIG. 7 is started at step 100, and at step 102 calls the data tag optimisation subroutine "data_tag_opt", which operates on the parameters "current_node" and "data_tag". The directed graph data structure is optimised by analysing the structure node by node, recursively, along each branch of the tree. The procedure keeps track of which node in the structure it is analysing by reference to a node label called p_node. The subroutine starts at step 104. At step 106 the node being analysed is labelled p_node and this becomes the current node. At step 108, the process interrogates the data as to whether the current node has arcs. If the answer is Yes, then at step 110 the number "n" of arcs branching from the node is read and, at step 112, a counter "i" is initialised to 0. At step 114, the data tag stored with the next arc, arc[i] is read (when i=0, arc[0] is the first arc at the node). At step 116 the data tag is compared with the previous data tag. If it is the same, then at step 118 the data tag is removed. If not, then the data tag is not removed and the routine moves directly to step 120 where it moves on to the next node (i.e. the node at the end of arc[i]). At step 122 the subroutine calls itself, i.e. it calls "data_tag_opt", to perform the analysis for the next node. This can be considered as performing the analysis at the next level down the tree.

If at step 108 the answer is No, the node must be a sink, and the subroutine returns (i.e. goes back up a level to the previous node) via step 128.

When the subroutine has been returned back up a level it continues to step 124 where the counter "i" is incremented by 1 and at step 126, if the counter has not reached "n", the number of arcs at the node, the data tag on the next arc is read by looping back to step 114. Once all the arcs at a node have been analysed (i.e. i=n) the subroutine moves to step 128 where it is returned back up to the node at the level above. Eventually, when the entire database has been analysed, the subroutine will be returned back to step 102 and the process is ended at step 130.

Referring back to FIG. 6, if the process is started at the root node and the first arc to be analysed is "B", then as there is no previous data tag the arc "B" retains the data tag (2) and the routine moves down a level to the next node (the node between "B" and "A"). The arc "A" is the next to be analysed and because this also has the data tag (2), which is the same as the previous arc, it is removed. The routine moves down a level to the next node. Here there are two arcs branching from the node, "B" and "R". The routine considers first the arc "B" (it could consider the arc "R", it would make no difference to the outcome). The routine moves on down the levels through the arcs "B", "Y", "L", "O", and "N", removing the data tags (2) from all of these arcs as they are the same as the first (2) on the first arc "B". When the routine reaches the sink (the last node) it is returned back up the levels until it reaches a node where there are further, as yet unanalysed, arcs branching from it, in this case the node with the arc "R". The procedure continues for all the arcs of the directed graph, finally producing the directed graph of FIG. 8, which has been optimised to contain a minimal number of data tags, thereby reducing redundancy of data tag information in the database.

The optimised database described above can be further reduced in size in accordance with an embodiment of the second aspect of the present invention. To achieve efficient storage of all keys it is desirable to rid the graph from redundancy. The nature of a directed graph requires that the path starting at the root node is the same for all keys that have an equal sequence of characters up to the point of a difference in one single character. Although keys might have equal character sequences in subsequent parts of the string, the path is held separately. Therefore, the database can be compacted by finding paths in the tree that have the same sequence of characters and data—i.e. paths that are equal—and reusing one single path rather than storing the path multiple times. Paths can be considered as equal only if the sequence of arcs is identical and the data tags stored along the arcs are identical.

Figure 9:
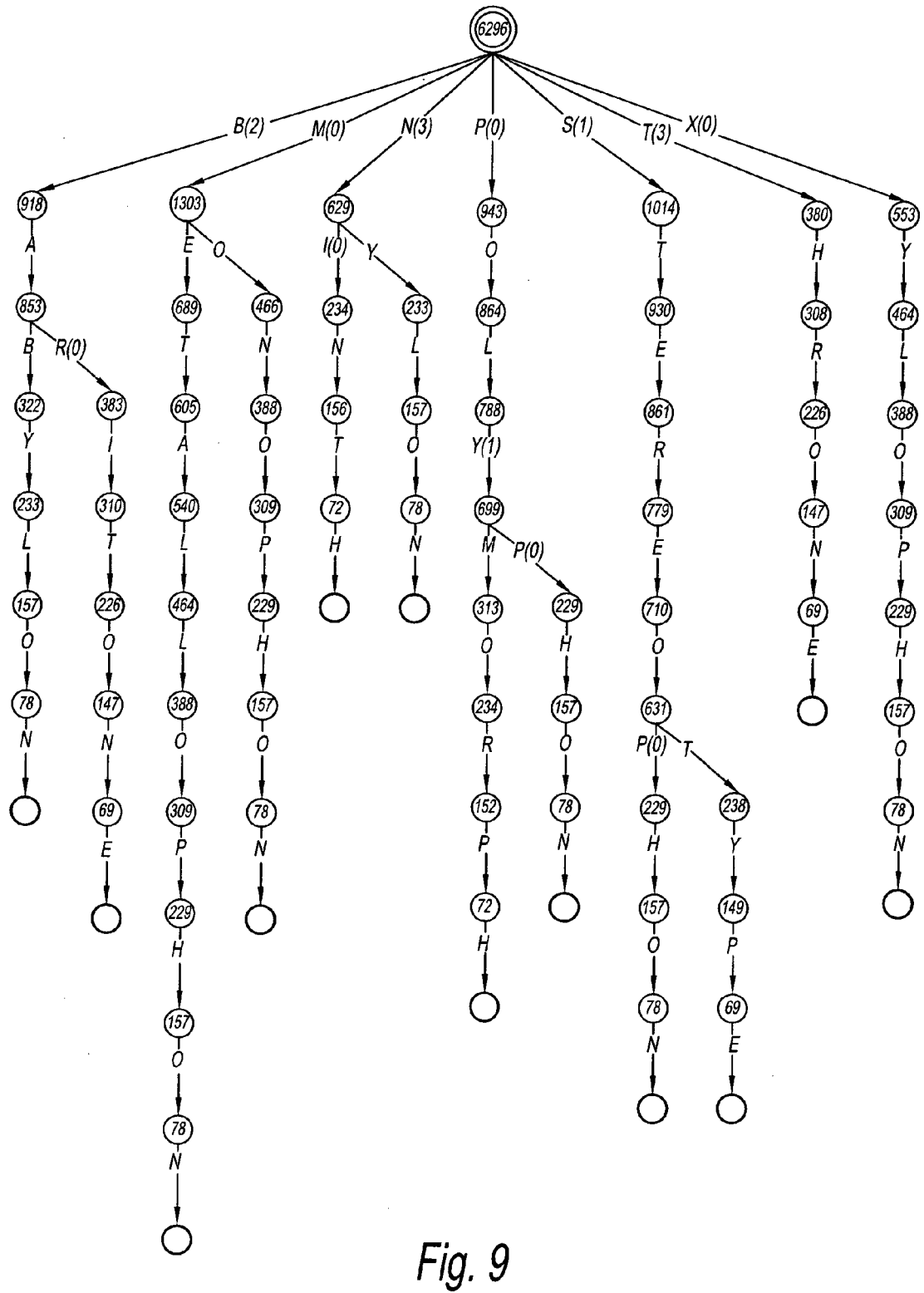
FIG. 9 shows the directed graph of FIG. 8 with weight values assigned to nodes in accordance with creation of the database embodying the first and second aspects of the present invention.

The method of creating the database embodying the second aspect of the invention will be described with reference to FIGS. 9 to 16. FIG. 9 shows the directed graph of FIG. 8 for the example data set of FIG. 3. In FIG. 9 the nodes have been assigned weight values (shown as numbers in the node circles). In this example each character has been assigned a character value, which in this case is the character's ASCII value. It will be appreciated that any consistent set of values could be used, which uniquely identifies every possible character found in the keys. The weight value of a node may be a checksum which is the sum of the character values of all the characters in the sub-tree below the node (i.e. between the node and all sinks that can be reached from the node). Put another way, the checksum is the sum of the character values of all the arcs branching from the node plus the weight values of the nodes at the ends of those arcs (sinks have zero weight value).

Figure 19A:
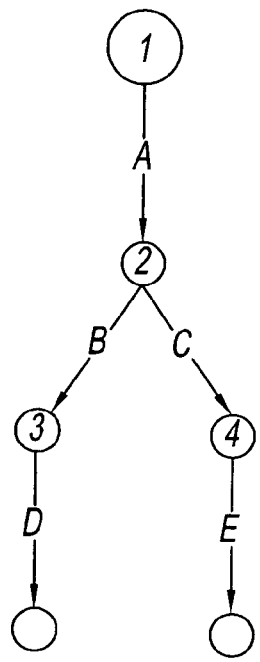
FIGS. 19a and 19b show further examples of paths for data items having weight values assigned to nodes in accordance with creation of the database embodying the first and second aspects of the present invention.

FIG. 19a shows a simple example of assigning checksums which does not form a part of the example database, but uses the same method. For the example presented a very simple checksum algorithm can be used: the checksum of a particular node is the sum of all character ASCII values of the node's arcs plus the checksum of all connected nodes.

Example Calculation:

A=65, B=66, C=67, D=68, E=69

Node 3=D=68

Node 4=E=69

Node 2=Node 3+Node 4+B+C=68+69+66+67=270

Node 1=Node 2+65=270+65=335

This algorithm is sufficient for the sample as it provides a reasonably unique value for a sub-tree as well as includes the level of the node—the higher the value, the larger the sub-tree. However, for larger trees it is recommended to use a more complex calculation to reduce the number of equal checksums and to take counter overflows into consideration.

Other methods of assigning checksums may be used. CRC and MD5 are two examples of known methods.

Figure 19B:
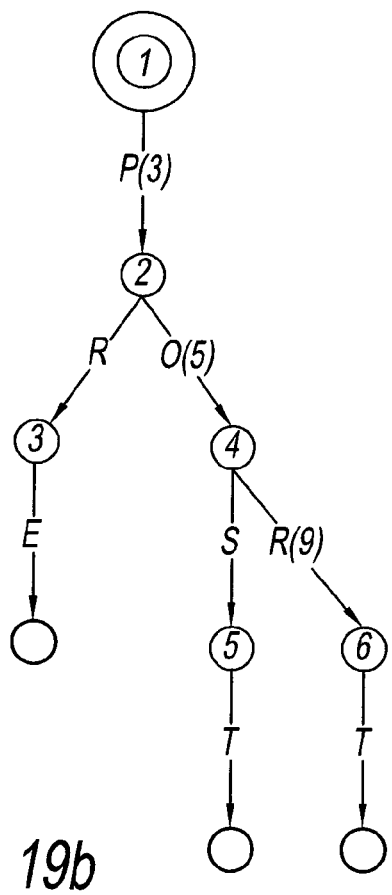

An example for calculating a compound checksum value is described with reference to FIG. 19b. The checksum is the concatenation of (1) the length of the longest path of the sub-tree, (2) the sum of the character values and (3) the sum of the data tag values. The format is a 9-digit number, padded with leading zeros in the form lllcccddd, where lll is the level, ccc is the character sum and ddd is the data sum. The checksum values for each of the nodes of FIG. 19b are summarised in the table below.

| Node 6: | | Character sum: 84 |
| --- | --- | --- |
| | Level: 1 | Data sum: 0 |
| | Characters: T | |
| | Data: none | 001084000 |
| Node 5: | | Character sum: 84 |
| | Level: 1 | Data sum: 0 |
| | Characters: T | |
| | Data: none | 001084000 |
| Node 4: | | Character sum: 83 + 82 + 84 + 84 = 333 |
| | Level: 2 | Data sum: 9 |
| | Characters: S, R, T, T | |
| | Data: 9 | 002333009 |
| Node 3: | | Character sum: 69 |
| | Level: 1 | Data sum: 0 |
| | Characters: E | |
| | Data: none | 001069000 |
| Node 2: | | Character sum: 82 + 69 + 79 + 83 + 84 + 82 + 84 = 563 |
| | Level: 3 (the longest path) | Data sum: 5 + 9 = 14 |
| | Characters: R, E, O, S, T, R, T | |
| | Data: 5, 9 | 003563014 |
| Node 1: | | Character sum: 80 + 82 + 69 + 79 + 83 + 84 + 82 + 84 = 643 |
| | Level: 4 (the longest path) | Data sum: 3 + 5 + 9 = 17 |
| | Characters: P, R, E, O, S, T, R, T | |
| | Data: 3, 5, 9 | 004643017 |

Figure 10:
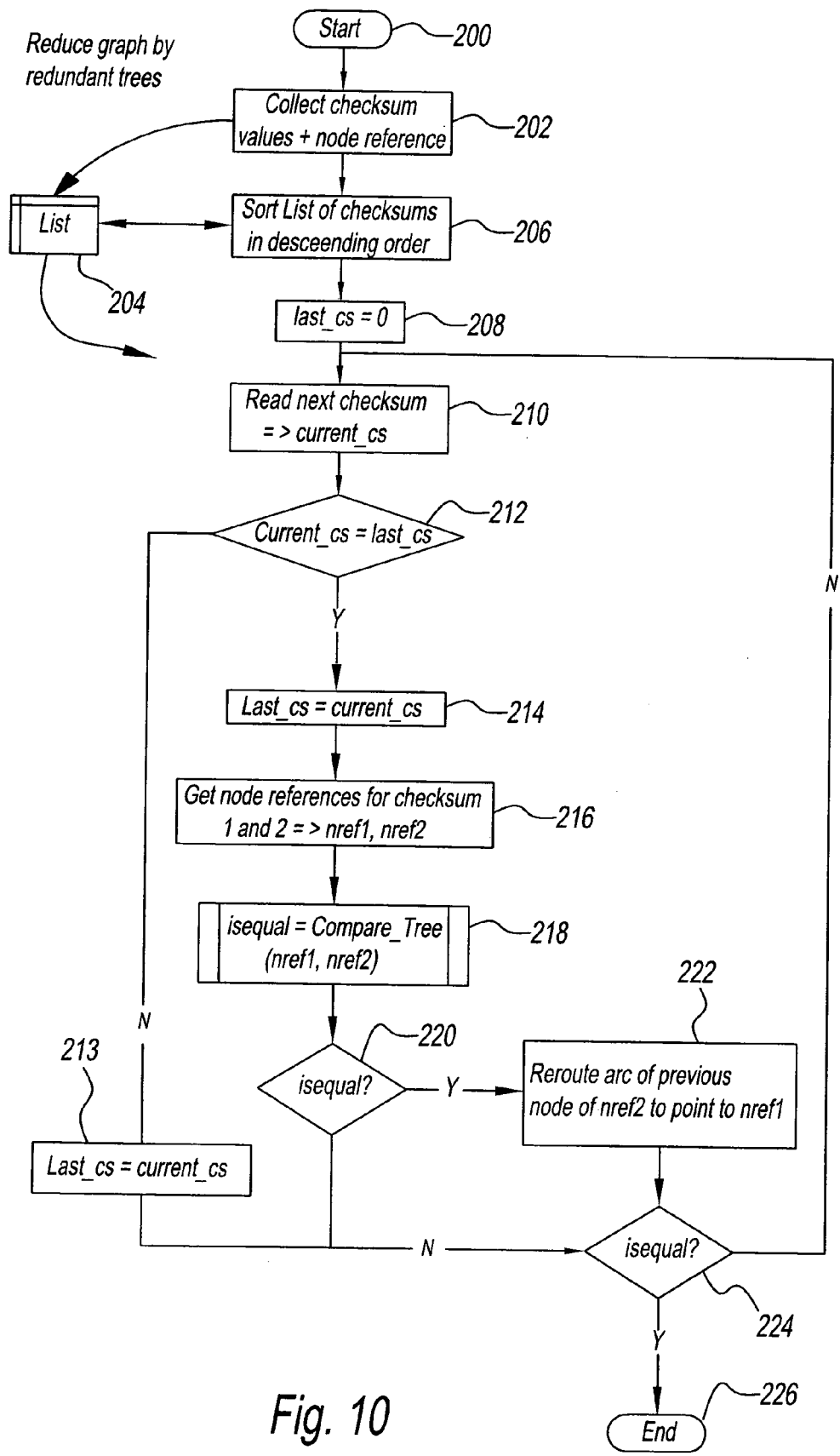
FIG. 10 is a flow diagram with reference to which data compaction in accordance with a fourth stage of the process of FIG. 2 is described.

The purpose of assigning checksums to the nodes is to perform the compaction method outlined in FIG. 10. Checksums represent a hash of a data set. This hash does not necessarily hold unique value depending on the data set, but can have the same value for several different sets of data. Computing time is, however, saved by comparing only sub-trees with equal checksums. Equal checksums indicate that sub-trees have a high probability of being identical. For fast and easy processing the checksums are first collected into a list, which is then sorted by descending value. As already indicated the checksum should represent the level information. The list will, therefore, show the largest sub-trees first. Each record in the list should additionally store a reference information to the corresponding node as a means of finding the node again later in the process. The reference, for example, may be a pointer to the memory location, or anything else appropriate. Best optimisation can be achieved by reducing large sub-trees prior to small sub-trees. Special care should be taken on implementation to ensure that, when reducing sub-trees, references stored with nodes do not become invalid.

Starting at step 200, the method reads in the database and at step 202 compiles a list 204 of all the nodes (identified by node references) and their associated checksums. At step 206 the list is sorted into a descending order of checksum values. At step 208 a variable called "last_cs" is set to 0. At step 210 the next checksum on the list is read and its value assigned to the variable "current_cs". At step 212 the values of "current_cs" and "last_cs" are compared. If they are not equal, the sub-trees below the nodes must be different and the method steps forward via step 213 where the parameter last_cs is set equal to current_cs (i.e. the checksum value of the current node) and on to step 224. However, if they are equal there is a possibility that the two sub-trees are identical. As will be described in an example later, it is not possible to be certain that they are identical and so it is necessary to perform a comparison of the sub-trees. At step 216 the node references, noderef1 and noderef2, of the nodes having equal checksums are read and at step 218 the comparison of the sub-trees is performed, as will be described below with reference to FIG. 11. If the comparison determines that the sub-trees are not identical by returning a FALSE flag at step 220 the method is stepped forward to step 224. At step 220, if the comparison has determined that the sub-trees are identical by returning a TRUE flag, then at step 222 the arc leading into the node of noderef2 is redirected to the node of noderef1 so that the sub-tree below the node of noderef2 can be removed from the database.

At step 224 the method determines if there are any more nodes on the list. If there are the method loops back to step 210, but if not the method is ended at step 226.

Figure 11:
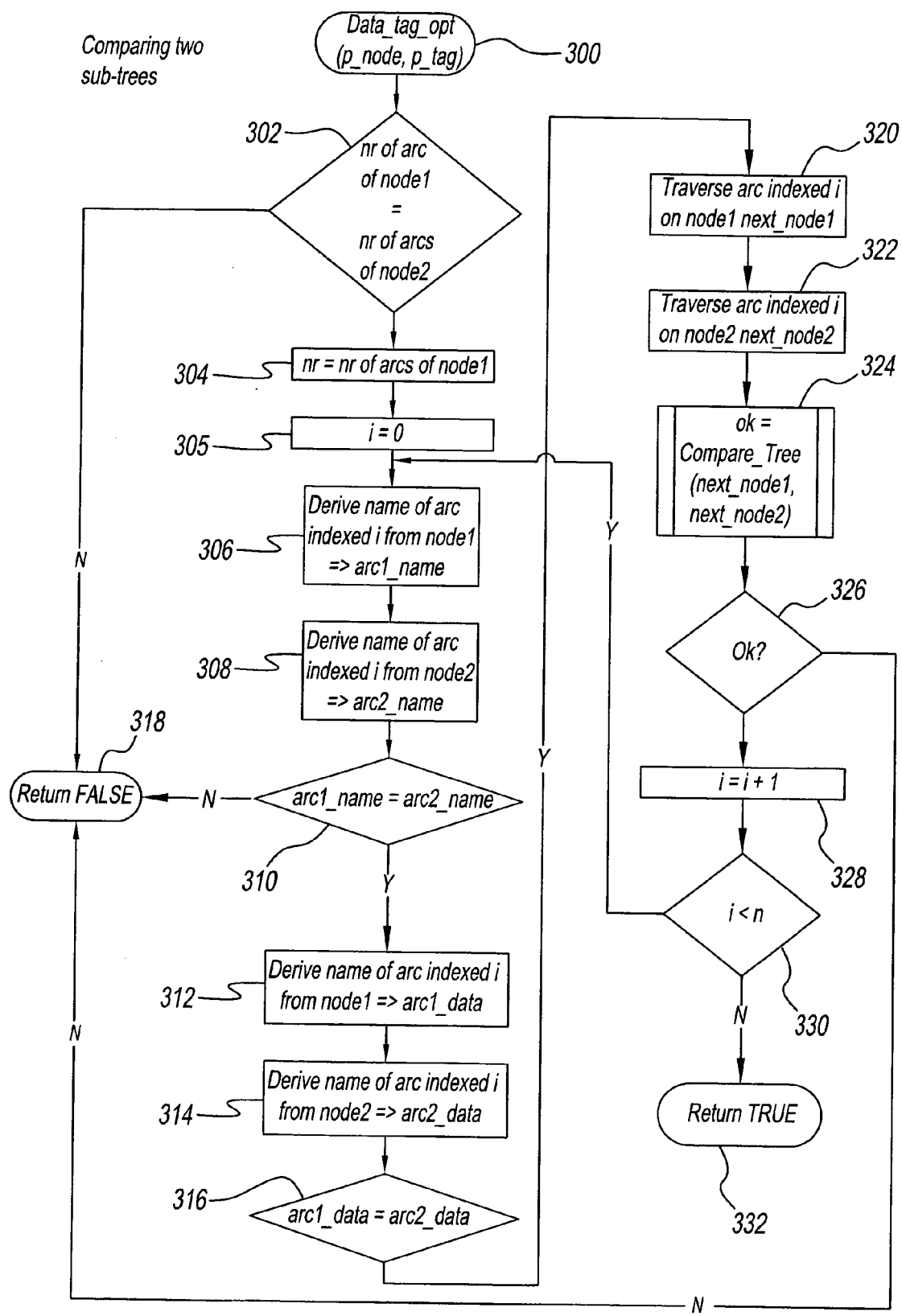
FIG. 11 is a flow diagram showing a recursive procedure adopted within the flow diagram of FIG. 10.

Referring to FIG. 11, the method for comparing the sub-trees is performed recursively. The subroutine "compare_tree" is started at step 300 to compare the sub-trees of two nodes identified at step 212 of FIG. 10 as having identical checksums and called here node1 and node2. At step 302 a comparison is made of the number of arcs branching from each of the nodes. If these are not equal, the sub-trees cannot be identical, and so the subroutine is returned with a FALSE flag at step 318. If the number of arcs is equal, then the subroutine continues at step 304 to set a variable "n" to equal the number of arcs and at step 305 initialises a counter "i" to 0. At steps 306 and 308 the subroutine reads the arc names (i.e. the characters) on the first arc of each node. The characters are read in the order of ascending character value (the values used to determine the node checksums). At step 310 a comparison of the arc names is made. If they are not the same, then the subroutine immediately returns with a FALSE flag at step 318.

Even if the arc names are the same, it is important that they are only considered identical if they carry the same data tags. Therefore at steps 312 and 314 the data tags of the arcs being compared are read. At step 316 the data tags are compared and if they are not the same the subroutine immediately returns with a FALSE flag at step 318. If they are the same then the subroutine moves on to compare the next nodes of the two sub-trees (next_node1 and next_node2) at steps 320 and 322. At step 324 the subroutine calls itself to compare the next nodes and to continue down the levels of the sub-tree in a recursive manner. If at any stage the subroutine identifies a disparity between the two sub-trees it is immediately returned at via steps 326 and 318 with a FALSE flag. If at step 326 the subroutine has returned recursively without a FALSE flag it moves to step 328 where the counter "i" is indexed by 1. If at step 330 it is determined that the entire sub-tree has been compared without a FALSE flag (i.e. i=n), then the subroutine returns with a TRUE flag.

The compaction method described with reference to FIGS. 10 and 11 can be applied to the example database shown in FIG. 9. To simplify the task of finding trees that are potentially equal, the checksum information from the tree is extracted into a sequential list of "checksum, pointer". The pointer is a reference to the particular node, and provides a means of finding it again.

| | | | | | |
|---|---|---|---|---|---|
| 6296, Node0 | 1303,... | 0309,... | 0864,... | 0861,... | 0226,... |
| 0918, Node1 | 0689,... | 0229,... | 0788,... | 0779,... | 0147,... |
| 0853,... | 0605,... | 0157,... | 0699,... | 0710,... | 0069,... |
| 0322,... | 0540,... | 0078,... | 0313,... | 0631,... | 0553,... |
| 0233,... | 0464,... | 0629,... | 0234,... | 0229,... | 0464,... |
| 0157,... | 0388,... | 0234,... | 0152,... | 0157,... | 0388,... |
| 0078,... | 0309,... | 0156,... | 0072,... | 0078,... | 0309,... |
| 0383,... | 0229,... | 0072,... | 0229,... | 0238,... | 0229,... |
| 0310,... | 0157,... | 0233,... | 0157,... | 0149,... | 0157,... |
| 0226,... | 0078,... | 0157,... | 0078,... | 0069,... | 0078,... |
| 0147,... | 0466,... | 0078,... | 1014,... | 0380,... | |
| 0069,... | 0388,... | 0943,... | 0930,... | 0308,... | |

This list is then sorted into descending checksum value order:

| | | | | | |
|---|---|---|---|---|---|
| 6296, Node0 | 0699,... | 0388,... | 0234,... | 0157,... | 0078,... |
| 1303,... | 0689,... | 0383,... | 0233,... | 0157,... | 0078,... |
| 1014,... | 0631,... | 0380,... | 0233,... | 0157,... | 0078,... |

-continued

| | | | | | |
|---|---|---|---|---|---|
| 0943,... | 0629,... | 0322,... | 0229,... | 0157,... | 0078,... |
| 0930,... | 0605,... | 0313,... | 0229,... | 0157,... | 0078,... |
| 0918, Node1 | 0553,... | 0310,... | 0229,... | 0156,... | 0072,... |
| 0864,... | 0540,... | 0309,... | 0229,... | 0152,... | 0072,... |
| 0861,... | 0466,... | 0309,... | 0229,... | 0149,... | 0069,... |
| 0853,... | 0464,... | 0309,... | 0226,... | 0147,... | 0069,... |
| 0788,... | 0464,... | 0308,... | 0226,... | 0147,... | 0069,... |
| 0779,... | 0388,... | 0238,... | 0157,... | 0078,... | |
| 0710,... | 0388,... | 0234,... | 0157,... | 0078,... | |

The first value found that is equal for two nodes is 464. Comparing the underlying trees shows that they are equal in character sequence as well as in data tags (no data tags in this case). Consequently reassigning the arc named "Y" of node A to point to node B can cut off the second tree. The storage resources used by the tree starting at node C can now be freed up—the tree is not connected any more.

388 is the next value to look at. Again one tree can be reduced. Although 388 occurs in the list three times, the third occurrence had already been cut off in the previous step and can therefore be ignored.

There are 3 occurrences of 309. However, after the above compaction only one is left and so no further action is necessary. The next value is 234. The two sub-trees have an equal checksum. On comparing the tree, it can be seen that they differ in character sequence. No reduction is therefore possible here.

Figure 12:
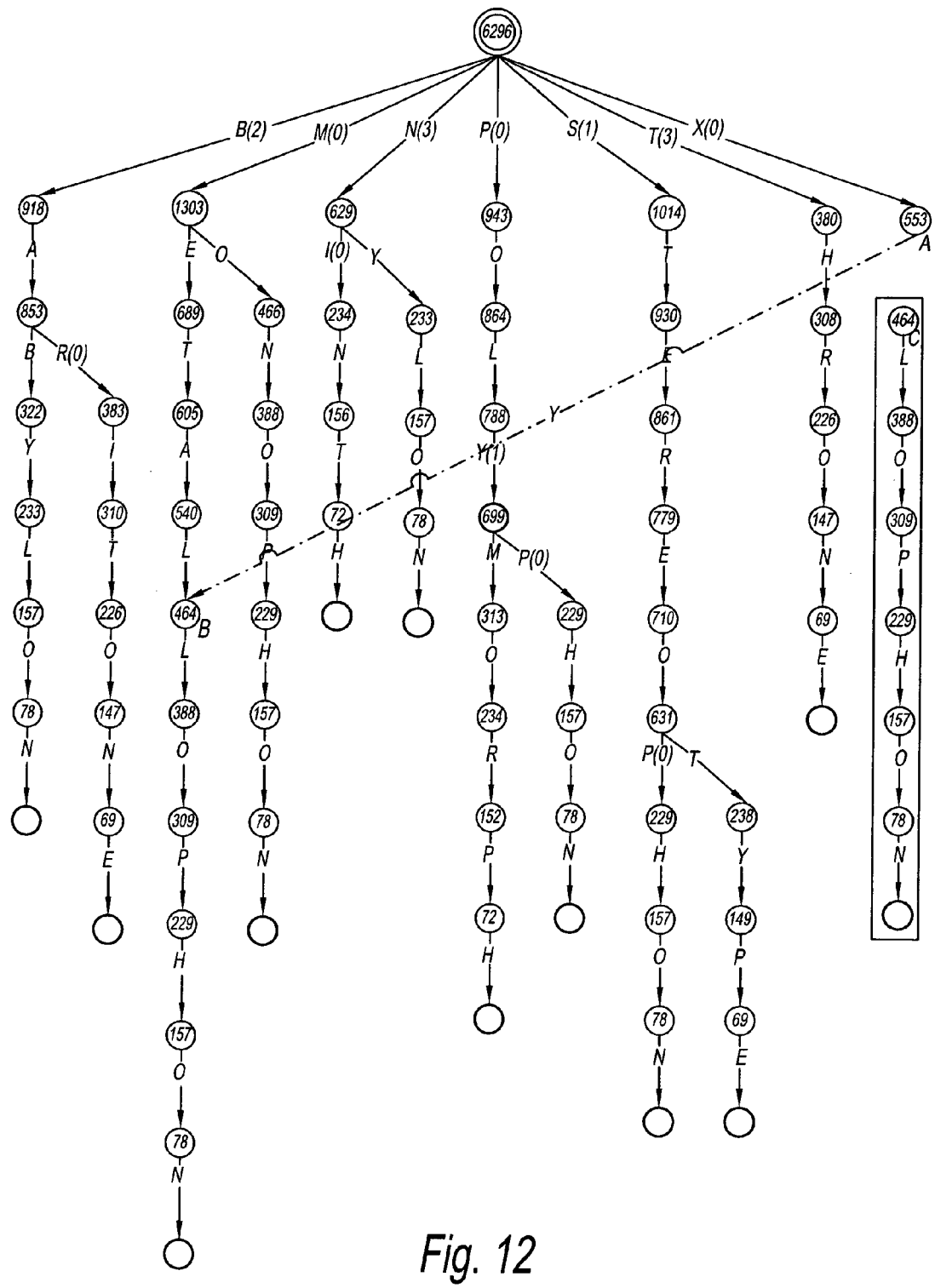
FIG. 12 shows the directed graph of FIG. 8 with an example of how arcs and nodes may be shared to extend from a common terminal node for a pair of data items having a common string of characters.

FIG. 12 illustrates this example. The keys METALLOPHON and XYLOPHON have both been categorised as music (category 0) and both end with the sequence of characters LOPHON. The nodes labelled B and C in FIG. 12 both have the checksum values 464. Comparison of the sub-trees determines that both contain identical characters and data tags, so the arc having arc name "Y" that connects the nodes labelled A and C is redirected to connect node A to node B. All the arcs that comprise the sub-tree below node C are then removed from the database.

Figure 13:
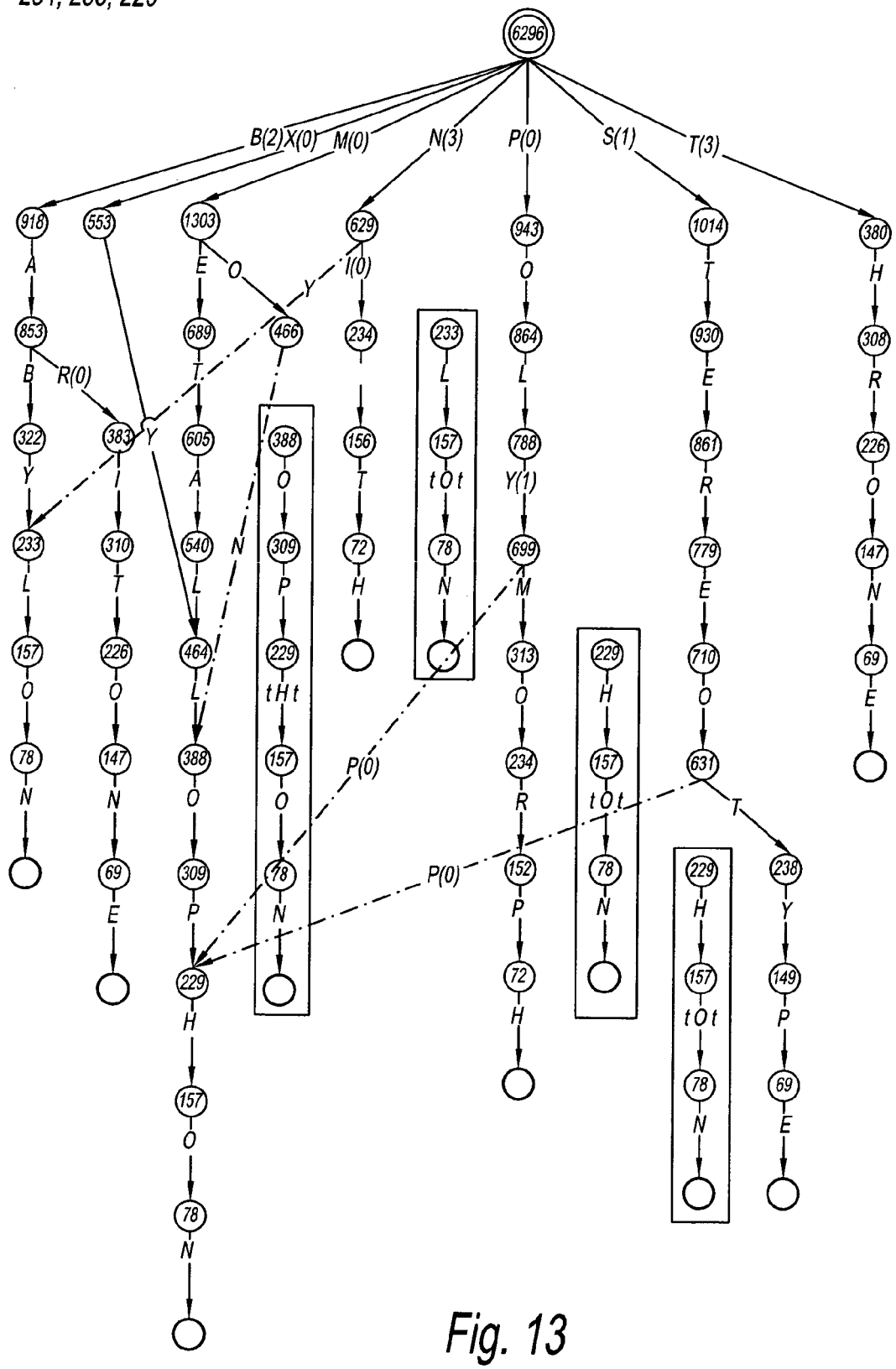
FIG. 13 shows the directed graph of FIG. 8 with further examples of how arcs and nodes are shared.

FIG. 13 shows similar compaction of the example database for other nodes having equal checksum values. The sub-trees shown in boxes with a shaded background are those that are being removed from the database.

Figure 14A:
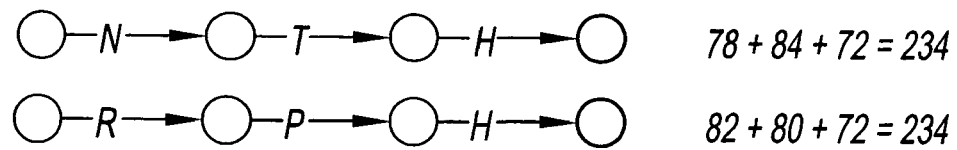
FIGS. 14a and 14b show examples of paths for two data items which do not share the same root node or sink node.

FIG. 14a presents an example of two nodes having equal checksum values, but which are not identical. The character values of both the sub-trees "NTH" and "RPH" produce checksums totalling 234 (see the nodes in the keys "NINTH" and "POLYMORPH" in FIG. 13). However, comparison of the individual characters soon indicates that they are not identical and causes the comparison subroutine of FIG. 11 to return a FALSE flag.

The more information that can be provided in the form of a weight value for each node, the more efficient the process of identifying equivalent sub-trees.

Figure 14B:
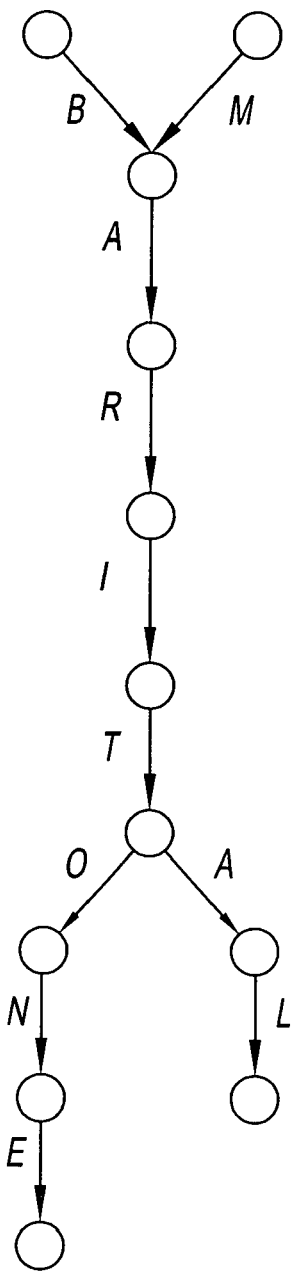

It might appear that further compaction of the data set is possible by combining groups of identical characters or character strings that occur in keys. FIG. 14b illustrates an example of two keys BARITONE and MARITAL. Both contain the same string of characters "ARIT". However the subroutine would not identify equal checksums and so compaction of the database to produce the sub-tree illustrated in FIG. 14b would not occur. This is important because compaction in this way would give rise to the possibility of keys not in the original data set being present in the final compacted database. In the example, the keys "MARITONE" and "BARITAL" are present in the compacted tree, even though they were not part of the original data set.

Figure 15:
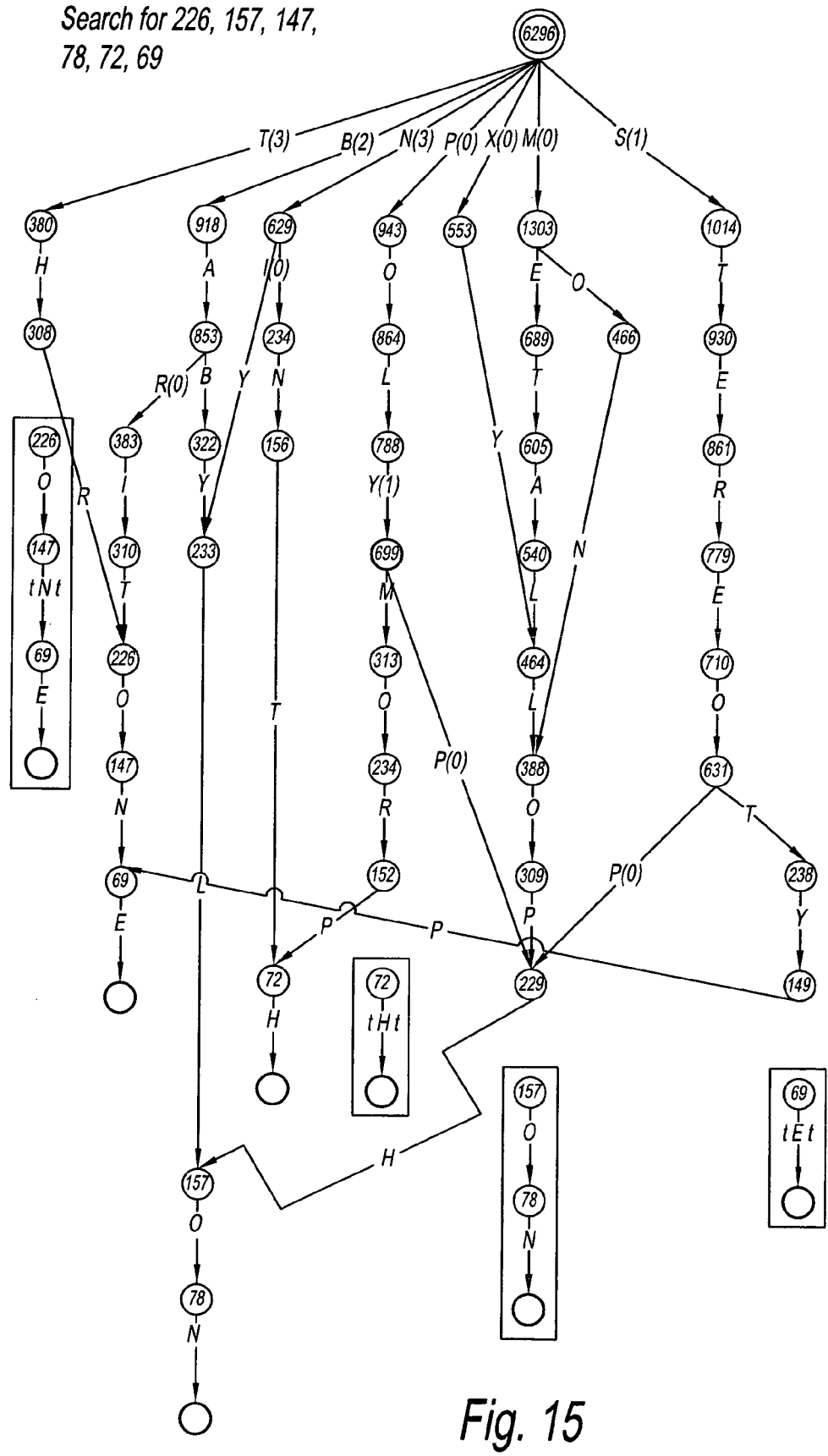
FIG. 15 shows the directed graph of FIG. 8 with yet further examples of how arcs and nodes are shared.

FIG. 15 illustrates further examples of compacting of the example data set at lower levels (i.e. at nodes having lower checksum values). Again, the sub-trees shown in boxes with a shaded background are those that are being removed from the database. It should be noted that the most efficient method of compacting the database is to start with comparing the highest checksum values first so as to remove the largest equivalent sub-trees from the data base first, and then proceed by comparing progressively smaller sub-trees having equal checksum values.

Figure 16:
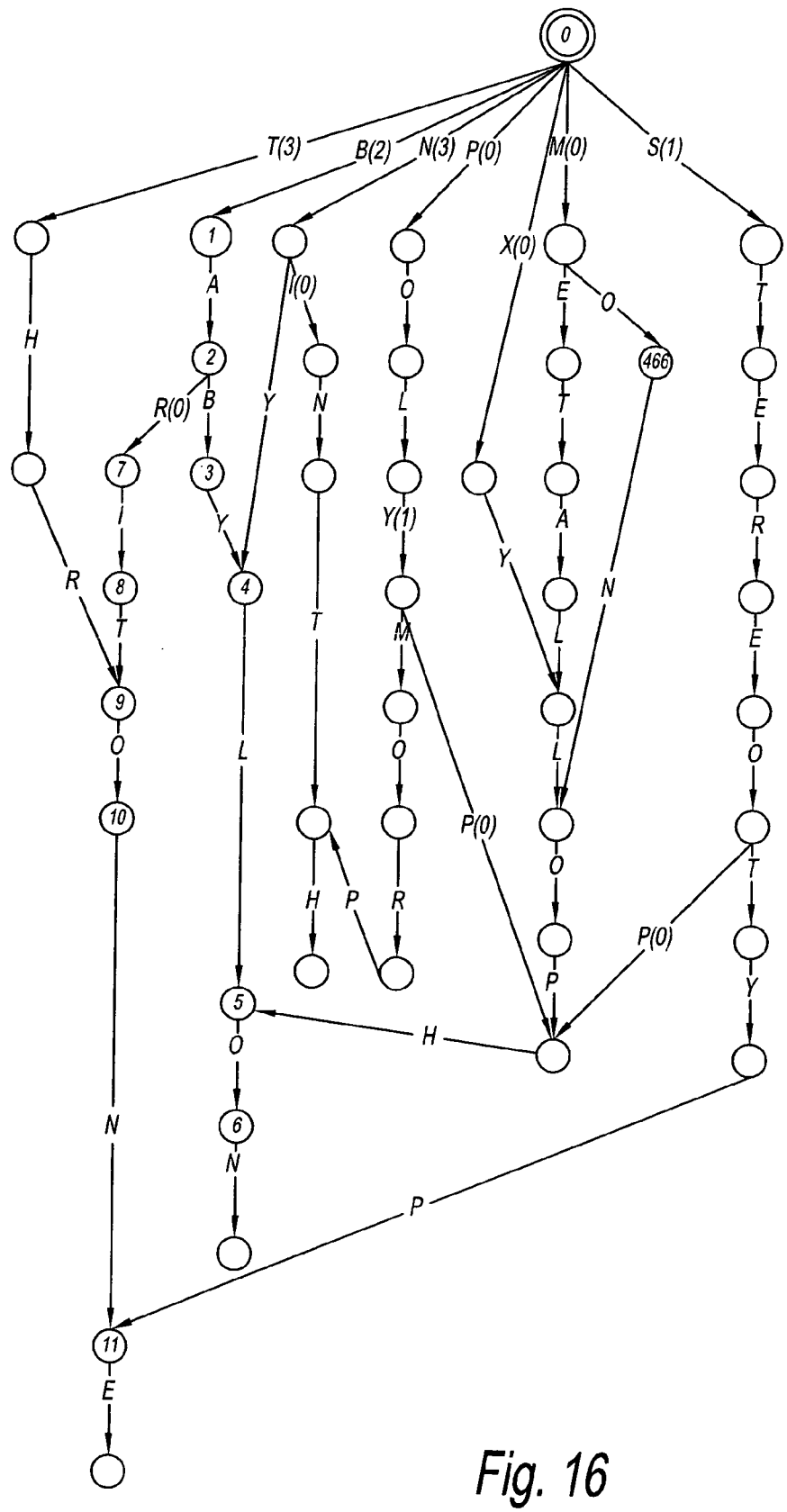
FIG. 16 shows the directed graph representation of FIG. 15, redrawn to illustrate a database structure optimised for redundancy using the example of FIG. 3.

FIG. 16 illustrates the example database in its final compacted form, with all the redundant arcs removed, and as such represents an embodiment of both of the first and second aspects of the present invention. All the original keys from the data set of FIG. 3 are present together with their associated data tags. Some of the nodes in FIG. 16 have numbers appearing in the circles that represent the nodes. These are not checksum values, but are node labels which will be used to describe the format in which the data is stored with reference to FIG. 17.

Having optimised and compacted the database, the data itself must be stored. As previously described, the data may be stored electronically in the format of a one dimensional binary encoded bit stream. A node is stored as its set of arcs, sorted in ascending order in terms of character information. For the purpose of fast searching, arcs are stored in ascending sorted order by their character value.

Figure 17:
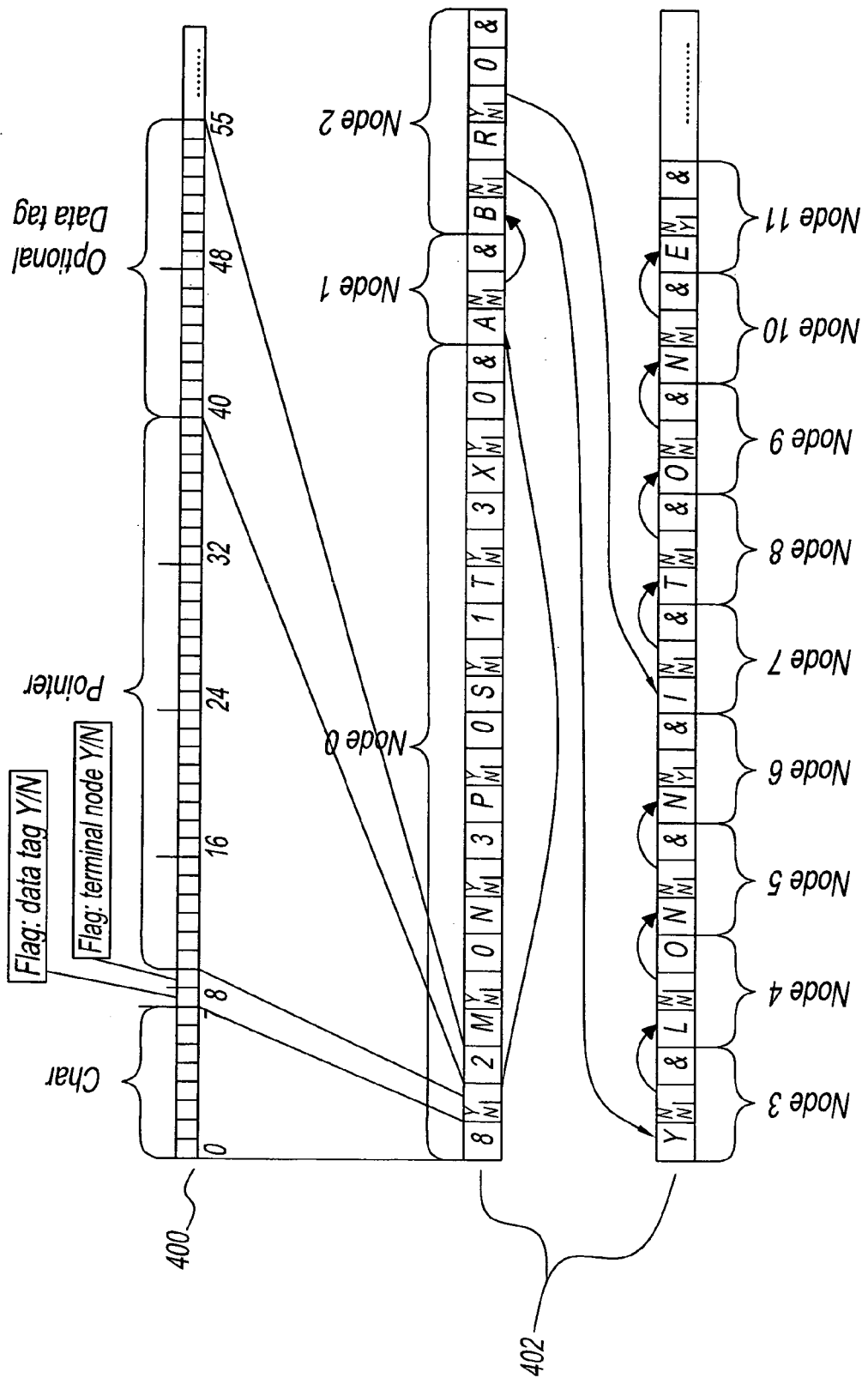
FIG. 17 shows how a database embodying the first and second aspects of the present invention may be represented in a data stream.

FIG. 17 is a representation of a bit stream. The top line 400 in FIG. 17 comprises 56 bits which are used to store the data associated with a single arc. The first 8 bits are the character itself as represented by its ASCII value. The ninth bit is a data tag flag. If this bit is a 1 it indicates that a data tag is also stored with the arc, but if it is a 0 there is no data tag. The tenth bit is another data flag which indicates whether or not the arc leads to a terminal node. The next 30 bits (bits 10 to 39) contain pointer information in the form of an address to the location in the data base of the first arc of the next node. The last 16 bits (bits 40 to 55) contain the data tag, if the data tag flag indicates its presence. Otherwise these bits are not present.

The next two lines 402 illustrate the data for a set of nodes corresponding to the nodes labelled 0 to 11 in FIG. 16. The bits that comprise the arc data in line 400 are shown compressed into the four fields, character, flags, pointer and data tag. Node 0 is the root node in FIG. 16 and has arcs with the characters B, M, N, P, S, T and X. The arc representing the character 'B' carries a data flag (shown here as a 'Y' for 'Yes') indicating the presence of a data tag, but no flag (shown here as N for 'No') indicating the presence of a terminal node; the pointer data for this arc points to the first arc ('A') of Node 1; and the arc carries the data tag '2'. Similar data is contained the fields representing the other arcs of node 0, all of which carry data tags, but none of which lead to a terminal node. Finally the character '&' is used to represent the termination of data for the node.

Node 1 has only a single arc representing the character 'A'. This arc carries no data tag and does not lead to a terminal node, so the flags are both shown as N.

Similar data appears in the data stream for all the other nodes. Note, however, that both Node 6 and Node 11 have arcs that lead to terminal nodes and carry the flag 'Y'.

Figure 18:
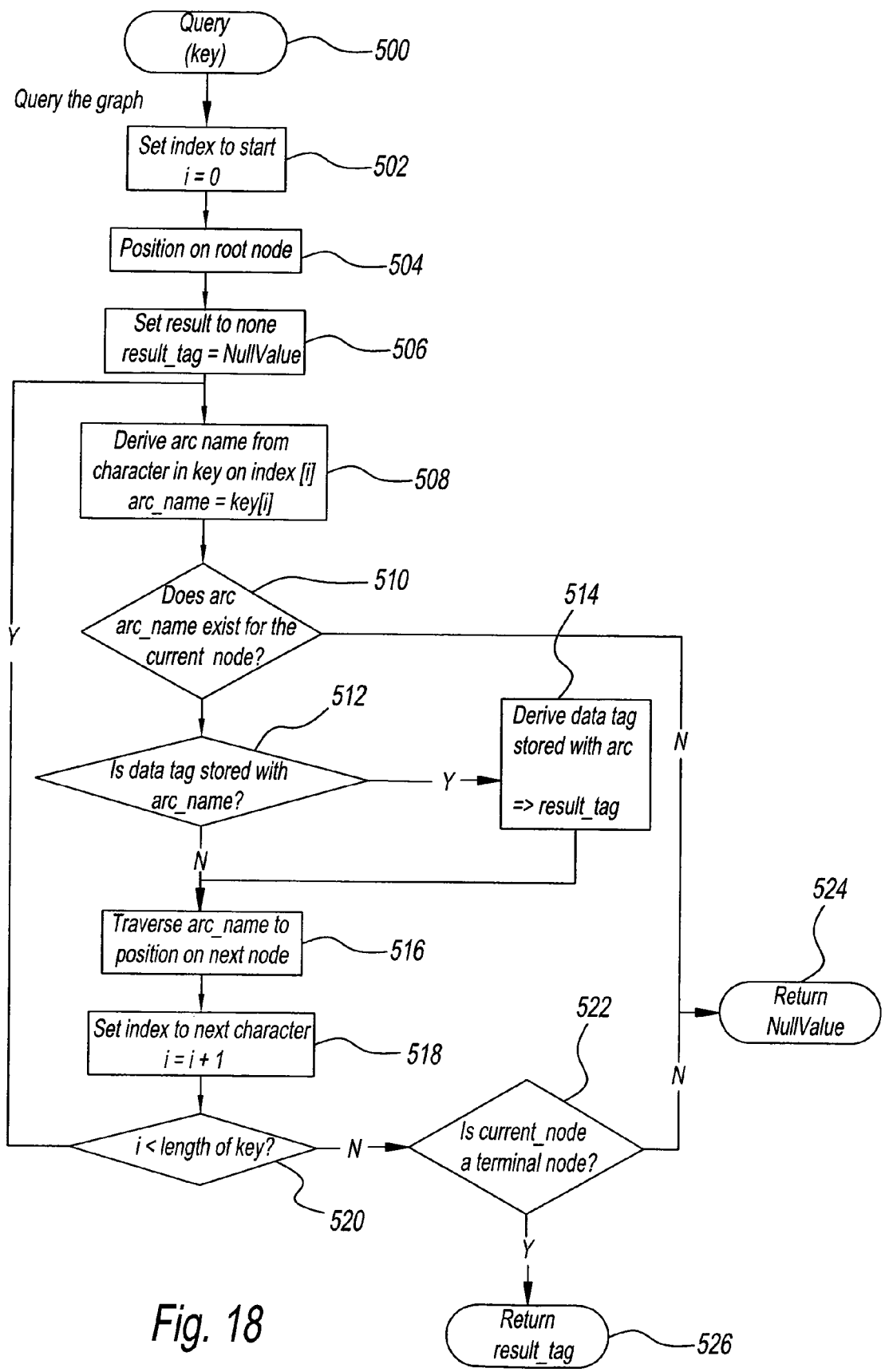
FIG. 18 is a flow diagram showing a rapid search and retrieval procedure for use with a database embodying the invention.

FIG. 18 illustrates a procedure for rapidly searching the database to find a key and return its associated data tag. At step 500 a query is read in the form of the key to be sought. At step 502 an indexing counter "i" is set to 0 and at step 504 the search is started at the root node of the data structure. As yet no data tags have been read and so at step 506 a parameter result_tag is set to a null value. At step 508 the parameter arc_name is set to the next character of the key, key[i]. At step 510 the procedure determines whether the arc name exists for the current node. If the arc_name does not exist the procedure steps directly to step 524 to return a null value. This means that the key is not to be found in the database.

If the arc_name of key[i] does exist, at step 512 the procedure determines if a data tag is stored with the arc. If there is a data tag, the parameter result_tag is set to the value of the data tag at step 514. At step 516 the procedure moves on to the next node and at step 518 the indexing counter "i" is incremented by 1. At step 520 the procedure determines whether the counter "i" is less than the length of the key (i.e. the number of characters in the key), and if it is the procedure returns to step 508 to look for the next character in the key. If the last character in the key has been reached, (i=key length) the procedure determines at step 522 whether the current node is a terminal node by reading the terminal node flag associated with the arc (see the data stream representation of FIG. 17). If the current node is not a terminal node, the key is not in the database and the procedure moves directly to step 524 to return a null data tag value. If the node is a terminal node then the procedure moves to step 526 to return the result_tag value, which is the data tag associated with the key, and confirms the presence of the key in the database.

The invention claimed is:

1. A method of generating a data structure having a plurality of keys representing respective Universal Resource Locators (URL) to be stored in the data structure and wherein respective categories among which the keys are grouped are indicative of content associated with said URL, wherein the method comprises:

generating a data structure represented by a tree data structure in which each of said plurality of keys comprises a sequence of characters associated with the respective at least one URL and is represented by a series of nodes and arcs connecting nodes in said series of nodes, wherein said series of nodes comprise an initial node and a terminal node, each of the keys defining a path extending from the initial node through at least one of the series of nodes to its corresponding terminal node and each of said arcs represents a respective character or characters of said sequence of characters, and wherein arcs and nodes on the path extending from said initial node which represent a sequence of characters sharable by different keys and with a common category are combined; and in the path defined by each key, associating one of the arcs with the category of the key with which said arc is associated; and compacting the data structure by combining a first series of arcs and nodes that includes a first terminal node and a first initial node with a second series of arcs and nodes that includes a second terminal node and a second initial node, wherein the first series of arcs and nodes represents a first sequence of characters and a category of a first key, the second series of arcs and nodes represents a second sequence of characters and a category of a second key that corresponds to the sequence of characters and the category of the first key, wherein said first terminal node and said second terminal node are sink nodes and wherein the combined first and second series of arcs and nodes define a single series of arcs and nodes with a single terminal node, the first key and second key being embodied by the combined series of arcs and nodes; and storing said data structure to a computer readable medium.

2. The method according to claim 1, the method further including further compacting the data structure by removing from a sequence of repeating identical categories all but one of said identical categories.

3. The method according to claim 2, wherein said one of said identical categories is the first occurrence thereof in the sequence.

4. The method according to claim 3, wherein compacting the data structure include a recursive routine.

5. The method according to claim 2, wherein compacting the data structure include a recursive routine.

6. The method according to claim 2 further including assigning a weight value to nodes of the data structure, the weight value of a given node being dependent on the characters between said given node and an associated sink(s), said given node and associated sink(s) defining a sub-tree of said data structure, and identifying two or more nodes having identical weight values as potentially having identical sub-trees.

7. The method according to claim 6 wherein the weight value is based on a checksum value incorporating the category or identifier of an arc extending from the node to which the weight value is being applied, in addition to the characters in the sub-tree.

8. The method according to claim 7 wherein the checksum value further incorporates an indication of the size of the associated sub-tree of the given node.

9. The method according to claim 6 wherein the step of compacting includes comparing with one another the nodes and sub-trees depending from, and including, nodes having identical weight values.

10. The method according to claim 9 wherein nodes having weight values representative of longer sub-trees are preferably compared and compacted prior to those representative of shorter ones.

11. The method according to claim 10 wherein nodes and their respective sub-trees identified as identical are rationalised by directing the arc(s) leading to one of the nodes to the other node and removing said one of the nodes and its associated sub-tree from the data structure.

12. The method according to claim 11 wherein the comparing step includes use of a recursive routine.

13. The method according to claim 2 wherein the tree data structure is in the form of a tree-structured directed graph.

14. The method according to claim 2, wherein the Universal Resource Locators (URLs) identify Internet web pages.

15. The method according to claim 1, wherein the step of compacting the data structure includes a recursive routine.

16. The method according to claim 1 further including assigning a weight value to nodes of the data structure, the weight value of a given node being dependent on the characters between said given node and an associated sink(s), said given node and associated sink(s) defining a sub-tree of said data structure, and identifying two or more nodes having identical weight values as potentially having identical sub-trees.

17. The method according to claim 16 wherein the weight value is based on a checksum value incorporating the category or identifier of an arc extending from the node to which the weight value is being applied, in addition to the characters in the sub-tree.

18. The method according to claim 17 wherein the checksum value further incorporates an indication of the size of the associated sub-tree of the given node.

19. The method according to claim 16, wherein the step of compacting includes comparing with one another the nodes and sub-trees depending from, and including, nodes having identical weight values.

20. The method according to claim 19 wherein nodes having weight values representative of longer sub-trees are preferably compared and compacted prior to those representative of shorter ones.

21. The method according to claim 20 wherein nodes and their respective sub-trees identified as identical are rationalised by directing the arc(s) leading to one of the nodes to the other node and removing said one of the nodes and its associated sub-tree from the data structure.

22. The method according to claim 21 wherein the comparing step includes use of a recursive routine.

23. The method according to claim 1 wherein the tree data structure is in the form of a tree-structured directed graph.

24. The method according to claim 1, wherein the Universal Resource Locators (URLs) identify Internet web pages.

25. The method according to claim 1, wherein the Universal Resource Locators (URLs) identify Internet web pages, the categories corresponding to subject matter types.

26. A computer program recorded on a computer readable storage medium and containing code for configuring a computer to perform a method of generating a data structure having a plurality of keys representing respective Universal Resource Locators (URL) to be stored in the data structure and wherein respective categories among which the keys are grouped are indicative of content associated with said URL, wherein the method comprises:

generating a data structure represented by a tree data structure in which each of said plurality of keys comprises a sequence of characters associated with the respective at least one URL and is represented by a series of nodes and arcs connecting nodes in said series of nodes, wherein said series of nodes comprise an initial node and a terminal node, each of the keys defining a path extending from the initial node through at least one of the series of nodes to its corresponding terminal node and each of said arcs represents a respective character or characters of said sequence of characters, and wherein arcs and nodes on the path extending from said initial node which represent a sequence of characters sharable by different keys and with a common category are combined; and in the path defined by each key, associating one of the arcs with the category of the key with which said arc is associated; and compacting the data structure by combining a first series of arcs and nodes that includes a first terminal node and a first initial node with a second series of arcs and nodes that includes a second terminal node and a second initial node, wherein the first series of arcs and nodes represents a first sequence of characters and a category of a first key, the second series of arcs and nodes represents a second sequence of characters and a category of a second key that corresponds to the sequence of characters and the category of the first key, wherein said first terminal node and said second terminal node are sink nodes and wherein the combined first and second series of arcs and nodes define a single series of arcs and nodes with a single terminal node, the first key and second key being embodied by the combined series of arcs and nodes; and storing said data structure to a computer readable medium.

* * * * *